US011981147B2

(12) United States Patent
Mizuta et al.

(10) Patent No.: US 11,981,147 B2
(45) Date of Patent: May 14, 2024

(54) PRINTING APPARATUS

(71) Applicant: SCREEN HOLDINGS CO., LTD., Kyoto (JP)

(72) Inventors: Tomohisa Mizuta, Kyoto (JP); Mitsuru Tanemoto, Kyoto (JP); Yuto Suzuki, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 119 days.

(21) Appl. No.: 17/795,159

(22) PCT Filed: Feb. 19, 2021

(86) PCT No.: PCT/JP2021/006311
§ 371 (c)(1),
(2) Date: Jul. 25, 2022

(87) PCT Pub. No.: WO2021/172190
PCT Pub. Date: Sep. 2, 2021

(65) Prior Publication Data

US 2023/0079276 A1 Mar. 16, 2023

(30) Foreign Application Priority Data

Feb. 28, 2020 (JP) ................................ 2020-033073

(51) Int. Cl.
*B41J 2/175* (2006.01)

(52) U.S. Cl.
CPC ....... *B41J 2/17566* (2013.01); *B41J 2/17596* (2013.01)

(58) Field of Classification Search
CPC .... B41J 2/175; B41J 2/17566; B41J 2/17596; B41J 2002/17569
See application file for complete search history.

(56) References Cited

U.S. PATENT DOCUMENTS

| | | | | |
|---|---|---|---|---|
| 9,409,405 B2 * | 8/2016 | Nagase | ................ | B41J 2/17596 |
| 2003/0132980 A1 * | 7/2003 | Yamazaki | ............ | B41J 2/17509<br>347/19 |

(Continued)

FOREIGN PATENT DOCUMENTS

| | | |
|---|---|---|
| JP | 2009-286144 A | 12/2009 |
| JP | 2018-118478 A | 8/2018 |

(Continued)

OTHER PUBLICATIONS

International Search Report issued in corresponding International Patent Application No. PCT/JP2021/006311 dated May 18, 2021, with English translation.

*Primary Examiner* — Anh T Vo
(74) *Attorney, Agent, or Firm* — Rimon P.C.

(57) ABSTRACT

A first printing unit and a second printing unit are supplied with ink from a first sub-tank and a second sub-tank, respectively. The first sub-tank and the second sub-tank are supplied with the ink from a first branch pipe and a second branch pipe, respectively. The first branch pipe is provided with a first valve, and the second branch pipe is provided with a second valve. A central control unit determines which one of the first sub-tank and the second sub-tank is to be preferentially supplied with ink based on at least one of the amount of remaining ink in each of the first sub-tank and the second sub-tank, and an estimated amount of consumption of ink in each of the first printing unit and the second printing unit, and controls the first valve and the second valve based on a result of the determination.

15 Claims, 15 Drawing Sheets

(56) References Cited

U.S. PATENT DOCUMENTS

| | | | | |
|---|---|---|---|---|
| 2004/0090501 | A1* | 5/2004 | Yoshida | B41J 2/17509 347/85 |
| 2013/0050309 | A1* | 2/2013 | Koike | B41J 2/19 347/6 |
| 2017/0291422 | A1 | 10/2017 | Urakami et al. | |
| 2018/0214904 | A1 | 8/2018 | Koganehira et al. | |
| 2018/0370241 | A1 | 12/2018 | Koganehira | |

FOREIGN PATENT DOCUMENTS

| | | | |
|---|---|---|---|
| JP | 2019-005929 | A | 1/2019 |
| WO | 2016/056450 | A1 | 4/2016 |
| WO | 2020/170752 | A1 | 8/2020 |

* cited by examiner

PRINTING APPARATUS

CROSS REFERENCE TO RELATED APPLICATIONS

This application is the U.S. National Phase under 35 US.C. § 371 of International Application No. PCT/JP2021/006311, filed on Feb. 19, 2021, which claims the benefit of Japanese Application No. 2020-033073, filed on Feb. 28, 2020, the entire contents of each are hereby incorporated by reference.

TECHNICAL FIELD

The present application relates to a printing apparatus.

BACKGROUND ART

Inkjet printers each including a plurality of printing heads, a plurality of sub-tanks, and one main tank have been conventionally proposed (e.g., Patent Document 1). In Patent Document 1, ink is supplied from one main tank to a plurality of sub-tanks. The sub-tanks are provided one-to-one with printheads and supply ink to the corresponding printheads. Each printing head performs printing using the supplied ink.

PRIOR ART DOCUMENTS

Patent Documents

Patent Document 1: Japanese Patent Application Laid-Open No. 2009-286144

SUMMARY

Problem to be Solved by the Invention

The main tank may simultaneously supply ink to the plurality of sub-tanks. That is, the ink may be supplied from the main tank to the plurality of sub-tanks in parallel. In this case, a flow rate of the ink supplied to each sub-tank deviates in accordance with pressure loss in a pipe between the main tank and each sub-tank. The pressure loss in the pipe is determined depending on installation environment of the printer, so that the deviation of the flow rate of the ink is also determined depending on the installation environment of the printer.

The sub-tank to which the ink is supplied at a small flow rate is likely to run out of ink. When the ink runs out in the sub-tank, the printing head connected to the sub-tank cannot perform printing, and thus the printing is interrupted.

Depending on the installation environment of the printer, variation in the pressure loss among the pipes increases, and thus the flow rate of the ink to be supplied to the sub-tank also increases. When the variation increases excessively, the ink is supplied to a certain sub-tank at a very small flow rate. Such a sub-tank may run out of ink earlier than other sub-tanks. That is, the printing head connected to the sub-tank cannot perform printing earlier than other printing heads.

Thus, an object of the present application is to provide an inkjet printing apparatus capable of adjusting a period during which a plurality of printing units can continue printing in parallel.

Means to Solve the Problem

A printing apparatus according to a first aspect includes: a first printing unit that applies ink to a printing medium to perform printing; a first sub-tank from which ink is supplied to the first printing unit; a second printing unit that applies ink to a printing medium to perform printing; a second sub-tank from which ink is supplied to the second printing unit; a first branch pipe through which ink is supplied to the first sub-tank; a second branch pipe through which ink is supplied to the second sub-tank; a common pipe through which ink is supplied to the first branch pipe and the second branch pipe; a main tank from which ink is supplied to the common pipe; a first valve provided in the first branch pipe; a second valve provided in the second branch pipe; and a control unit that determines which of the first sub-tank and the second sub-tank is to be preferentially supplied with ink based on at least one of the amount of remaining ink in each of the first sub-tank and the second sub-tank, and an estimated amount of consumption of ink in each of the first printing unit and the second printing unit, and that controls the first valve and the second valve based on a result of the determination.

A printing apparatus according to a second aspect of is the printing apparatus according to the first aspect, in which the control unit compares the amount of remaining ink in the first sub-tank and the amount of remaining ink in the second sub-tank to determine to preferentially supply ink to a sub-tank having a smaller amount of remaining ink between the first sub-tank and the second sub-tank.

A printing apparatus according to a third aspect is the printing apparatus according to the second aspect, in which when the first printing unit is during print processing and the second printing unit is not during print processing, the control unit determines to preferentially supply ink to the first sub-tank rather than the second sub-tank.

A printing apparatus according to a fourth aspect is the printing apparatus according to the second aspect, in which when the first printing unit is during print processing based on print image data and the second printing unit is in another state, the control unit determines to preferentially supply ink to the first sub-tank rather than the second sub-tank.

A printing apparatus according to a fifth aspect is the printing apparatus according to the fourth aspect, in which when the first printing unit is during the print processing based on the print image data and the second printing unit is during performing print processing for checking a printing state, the control unit determines to preferentially supply ink to the first sub-tank rather than the second sub-tank.

A printing apparatus according to a sixth aspect is the printing apparatus according to the fourth aspect, in which when the first printing unit is during the print processing based on the print image data and the second printing unit is during performing a recovery process, the control unit determines to preferentially supply ink to the first sub-tank rather than the second sub-tank.

A printing apparatus according to a seventh aspect is the printing apparatus according to any one of the second to sixth aspects, in which the control unit determines as follows: the first sub-tank needs to be supplied with ink when the amount of remaining ink in the first sub-tank is less than a predetermined refill reference value; the second sub-tank needs to be supplied with ink when the amount of remaining ink in the second sub-tank is less than the predetermined refill reference value; and one of the first sub-tank and the second sub-tank, the one being earlier in timing at which the amount of remaining ink falls below the predetermined refill reference value, is preferentially supplied with ink, when the amount of remaining ink in each of the first sub-tank and the second sub-tank is less than the predetermined refill reference value, and a difference between the amount of remaining ink in the first sub-tank and the amount of remaining ink in the second sub-tank is less than a predetermined difference reference value.

A printing apparatus according to an eighth aspect is the printing apparatus according to any one of the first to seventh aspects, in which the control unit calculates the estimated amount of consumption of ink in each of the first printing unit and the second printing unit until a predetermined period elapses from a current point of time, and the control unit determines to preferentially supply ink to the first sub-tank rather than the second sub-tank in the predetermined period when the estimated amount of consumption of ink in the first printing unit is larger than the estimated amount of consumption of ink in the second printing unit.

A printing apparatus according to a ninth aspect is the printing apparatus according to any one of the first to eighth aspects, in which the control unit calculates the estimated amount of consumption of ink in each of the first printing unit and the second printing unit until a predetermined period elapses from the current point of time, and the control unit determines a higher priority of supplying ink for one of the first sub-tank and the second sub-tank, the one having a larger estimated amount of consumption of ink in the corresponding printing unit and a smaller amount of remaining ink at the current point of time.

A printing apparatus according to a tenth aspect is the printing apparatus according to the ninth aspect, in which the control unit calculates an estimated amount of remaining ink in the first sub-tank after elapse of the predetermined period based on the amount of remaining ink in the first sub-tank and the estimated amount of consumption of ink in the first printing unit, the control unit calculates an estimated amount of remaining ink in the second sub-tank after elapse of the predetermined period based on the amount of remaining ink in the second sub-tank and the estimated amount of consumption of ink in the second printing unit, the control unit determines to preferentially supply ink to one of the first sub-tank and the second sub-tank in the predetermined period, the one having a smaller amount of estimated remaining ink.

A printing apparatus according to an eleventh aspect is the printing apparatus according to the ninth aspect, in which the control unit calculates a priority of the first sub-tank by weighting the amount of remaining ink in the first sub-tank and the estimated amount of consumption of ink in the first printing unit, and the control unit calculates a priority of the second sub-tank by weighting the amount of remaining ink in the second sub-tank and the estimated amount of consumption of ink in the second printing unit.

A printing apparatus according to a twelfth aspect is the printing apparatus according to any one of the sixth to eleventh aspects, in which the control unit determines which one of the first sub-tank and the second sub-tank is to be preferentially supplied with ink, when the amount of remaining ink in each of the first sub-tank and the second sub-tank is equal to or greater than a switching reference value, based on the amount of remaining ink in each of the first sub-tank and the second sub-tank without using the estimated amount of remaining ink in each of the first printing unit and the second printing unit, and the control unit determines which one of the first sub-tank and the second sub-tank is to be preferentially supplied with ink, when at least one of the amount of remaining ink in the first sub-tank and the amount of remaining ink in the second sub-tank is less than the switching reference value, based on the amount of remaining ink in each of the first sub-tank and the second sub-tank, and the estimated amount of remaining ink in each of the first printing unit and the second printing unit.

A printing apparatus according to a thirteenth aspect is the printing apparatus according to any one of the first to twelfth aspects, in which the control unit calculates an estimated total amount of consumption of ink in the first printing unit and an estimated total amount of consumption of ink in the second printing unit, the estimated total amounts being necessary for remaining printing of the print image data, the control unit calculates a first value obtained by subtracting the estimated total amount of consumption of ink in the first printing unit from the amount of remaining ink in the first sub-tank and a second value obtained by subtracting the estimated total amount of consumption of ink in the second printing unit from the amount of remaining ink in the second sub-tank, and the control unit determines to preferentially supply ink to the second sub-tank when the first value is positive and the second value is negative.

A printing apparatus according to a fourteenth aspect is the printing apparatus according to any one of the first to thirteenth aspects, the printing apparatus including: a main pump provided in the common pipe; at least one sub-pump that feeds ink from the first sub-tank to the first printing unit; and a first liquid level sensor that detects that the amount of remaining ink in the first sub-tank is a first reference value, in which the control unit controls the first valve and the second valve exclusively for each other, the control unit obtains an inflow of ink supplied from the main pump to the first sub-tank based on an operation time in which the main pump operates while the first valve is opened and a value of liquid feeding ability of the main pump, and an outflow of ink supplied from the first sub-tank to the first printing unit based on the operation time of the sub-pump and a value of liquid feeding ability of the sub-pump, and the control unit calculates the amount of remaining ink in the first sub-tank based on the inflow of ink to the first sub-tank and the outflow of ink from the first sub-tank from a time point when the first liquid level sensor detects that the amount of remaining ink in the first sub-tank equals to the first reference value.

A printing apparatus according to a fifteenth aspect is the printing apparatus according to the fourteenth aspect, the printing apparatus further including a second liquid level sensor that detects that the amount of remaining ink in the first sub-tank is a second reference value larger than the first reference value, in which the first printing unit includes a front surface printing unit to which ink is supplied from the first sub-tank and a back surface printing unit to which ink is supplied from the first sub-tank, the at least one sub-pump includes a front-surface-side pump that feeds ink from the first sub-tank to the front surface printing unit and a back-surface-side pump that feeds ink from the first sub-tank to the back surface printing unit, and the control unit updates a value of liquid feeding ability of the front-surface-side pump and a value of liquid feeding ability of the back-surface-side pump based on a calculated value of an outflow of ink and an actual value of the outflow of ink, the calculated value being a sum of a first product of an operation time of the front-surface-side pump and a value of the liquid feeding ability of the front-surface-side pump within a sub-measurement period until the amount of remaining ink in the first sub-tank equals to the first reference value from the second reference value, and a second product of an operation time of the back-surface-side pump and a value of the liquid feeding ability of the back-surface-side pump within the sub-measurement period, and the actual value being a difference between the second reference value and the first reference value.

Effects of the Invention

The printing apparatus according to the first aspect enables adjusting a period during which the first printing unit and the second printing unit can continue printing in parallel.

The printing apparatus according to the second aspect enables reducing a difference in the amount of remaining ink between the first sub-tank and the second sub-tank. Thus, the period during which the first printing unit and the second printing unit can continue printing in parallel can be increased.

The printing apparatus according to each of the third to sixth aspects enables the first printing unit to continue printing.

The printing apparatus according to the seventh aspect enables supplying ink to a sub-tank that has previously required supply of ink when sub-tanks each have a substantially equal amount of remaining ink.

The printing apparatus according to the eighth aspect preferentially supplies ink to the first sub-tank from which more ink flows out. Possibility that ink runs out in the first sub-tank can be effectively reduced.

The printing apparatus according to the ninth aspect preferentially supplies ink to the sub-tank having a larger outflow of ink and a smaller amount of remaining ink. Thus, the period during which the first printing unit and the second printing unit can continue printing in parallel can be appropriately increased.

The printing apparatus according to the tenth aspect preferentially supplies ink to the sub-tank having a smaller estimated amount of remaining ink, and thus enables the period during which the first printing unit and the second printing unit can continue printing in parallel to be further appropriately increased.

The printing apparatus according to the eleventh aspect enables setting a relative priority appropriately for each of the amount of remaining ink and the estimated amount of consumption of ink by weighting.

The printing apparatus according to the twelfth aspect does not use the estimated amount of remaining ink when the first sub-tank and the second sub-tank each have a large amount of remaining ink, and thus enables reducing processing. In contrast, when at least one of the first sub-tank and the second sub-tank has a small amount of remaining ink, not only the amount of remaining ink but also the estimated amount of remaining ink is used, and thus enabling the amount of remaining ink in each of the first sub-tank and the second sub-tank to be adjusted with higher accuracy.

The printing apparatus according to the thirteenth aspect allows the first sub-tank to store the amount of ink necessary for printing print image data in the first printing unit, and thus does not cause the first sub-tank to run out of ink. In contrast, the ink is preferentially supplied to the second sub-tank. Thus, possibility that ink runs out in the second sub-tank can be also reduced.

The printing apparatus according to the fourteenth aspect allows the first valve and the second valve to be controlled exclusively for each other. Thus, when the main pump operates with the first valve opened, the main pump supplies ink to the first sub-tank instead of the second sub-tank. Thus, an inflow of ink into the first sub-tank can be appropriately calculated based on an operation time of the main pump with the first valve opened and the liquid feeding ability of the main pump. As a result, the amount of remaining ink in the first sub-tank can be appropriately calculated. That is, the amount of remaining ink in the first sub-tank can be measured using the first liquid level sensor with a simple structure.

The printing apparatus according to the fifteenth aspect of the printing apparatus updates a value of the liquid feeding ability based on an actual measurement value, and thus enables the liquid feeding ability to be brought close to an actual value. Thus, hereinafter, the amount of remaining ink in the sub-tank can be calculated with higher accuracy.

DESCRIPTION OF EMBODIMENTS

Hereinafter, embodiments will be described with reference to the accompanying drawings. Components described in the embodiments are each only an example, so that the scope of the present disclosure does not intend to be limited to only the components. The drawings illustrate components that may be each exaggerated or simplified in dimension and number as necessary for easy understanding.

Expressions indicating a relative or absolute positional relationship, such as "in one direction", "along one direction", "parallel", "orthogonal", "center", "concentric", and "coaxial", not only strictly represent the positional relationship, but also represent a state where components are relatively displaced in angle or distance within a tolerance or a range in which a similar function is obtained, unless otherwise specified. Expressions indicating equal states, such as "same", "equal", and "homogeneous", not only represent states that are quantitatively and strictly equal, but also represent states in which there are tolerances or differences in which similar functions can be obtained, unless otherwise specified. Unless otherwise specified, expression indicating shape, such as "quadrangular" or "cylindrical", not only represents the shape geometrically and strictly, but also represents a shape having unevenness or a chamfer, for example, within a range in which effect at a similar level can be obtained. The expression, "comprising" "providing" "including" "containing" or "having" one component is not an exclusive expression of excluding presence of other components. The expression, "at least any one of A, B, and C", includes only A, only B, only C, any two of A, B, and C, and all of A, B, and C.

<Printing Apparatus>

Figure 1:
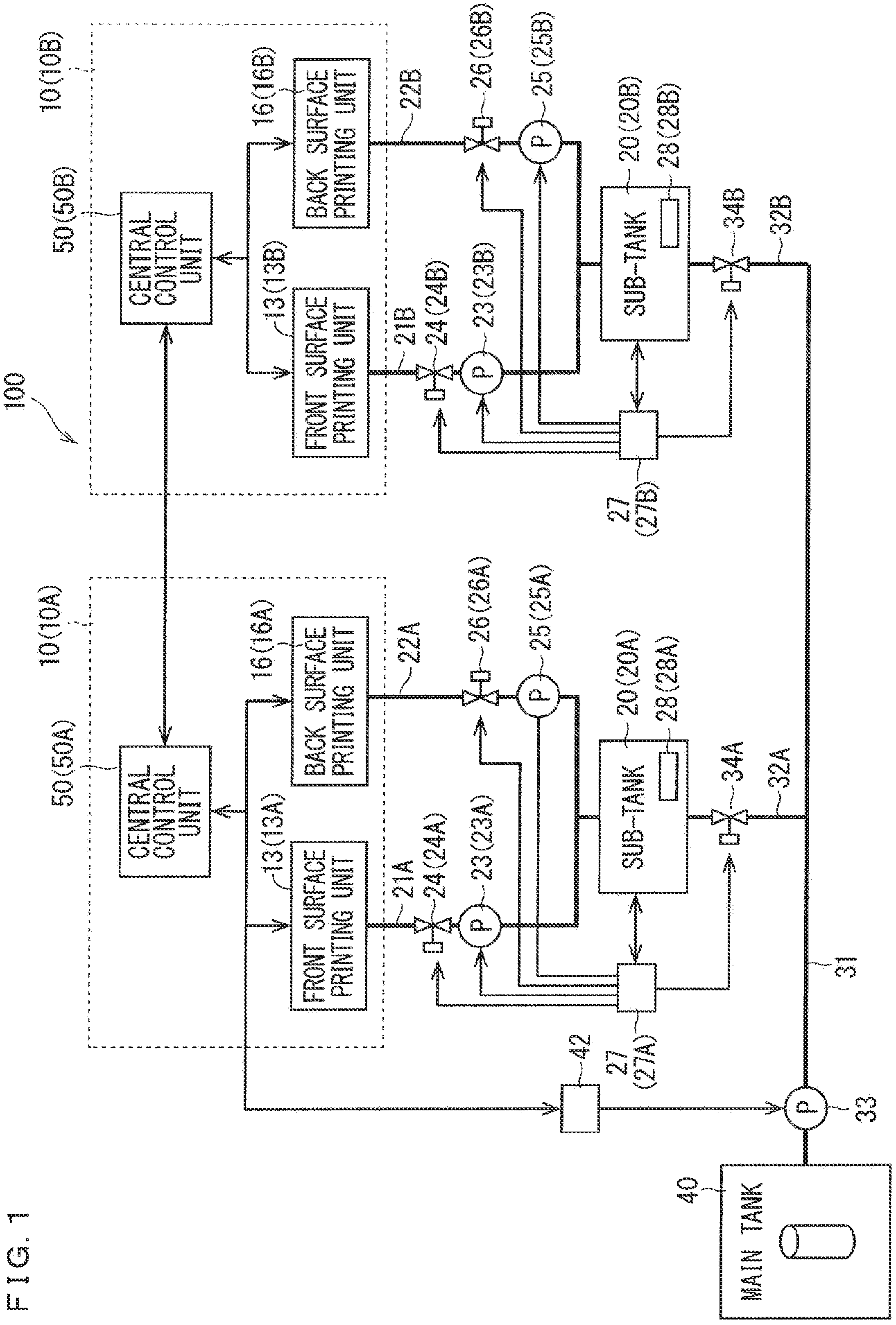
FIG. 1 is a diagram schematically illustrating an example of a configuration of a printing apparatus.

FIG. 1 is a diagram schematically illustrating an example of a configuration of a printing apparatus 100. The printing apparatus 100 includes a plurality of printing units 10, a plurality of sub-tanks 20, and a main tank 40. As described in detail later, each printing unit 10 performs printing on a continuous paper sheet WP that is an example of a print medium. The example of FIG. 1 illustrates two printing units 10A and 10B as the plurality of printing units 10.

The plurality of sub-tanks 20 is provided corresponding to the plurality of printing units 10. Specifically, the sub-tanks 20 are provided on a one-to-one basis with the printing units 10. The two printing units 10A and 10B are provided in the example of FIG. 1, so that two sub-tanks 20A and 20B are provided as the sub-tanks 20. Each sub-tank 20 stores ink and supplies the ink to the printing unit 10 corresponding to itself. Specifically, the sub-tank 20A supplies ink to the printing unit 10A, and the sub-tank 20B supplies ink to the printing unit 10B.

Each sub-tank 20 includes multiple tanks that stores respective types of ink. For example, each sub-tank 20 includes four tanks that are each for storing corresponding one of an ink for black (K), an ink for cyan (C), an ink for magenta (M), and an ink for yellow (Y). Hereinafter, a tank of one color will be mainly described for simplicity of description.

The printing unit 10 is an inkjet printing apparatus. The printing unit 10 in the example of FIG. 1 includes a front surface printing unit 13 and a back surface printing unit 16. As described in detail later, the front surface printing unit 13 performs printing on a front surface of the continuous paper sheet WP that is an example of a print medium, and the back surface printing unit 16 performs printing on a back surface of the continuous paper sheet WP.

Hereinafter, "A" may be added to the end of a reference numeral of each component belonging to the printing unit 10A, and "B" may be added to the end of a reference numeral of each component belonging to the printing unit 10B. For example, the front surface printing unit 13 belonging to the printing unit 10A may be referred to as a front surface printing unit 13A.

The sub-tank 20A is connected to the front surface printing unit 13A via a supply pipe 21A, and is connected to a back surface printing unit 16A via a supply pipe 22A. The supply pipe 21A is provided with a pump 23A (corresponding to a front-surface-side pump) and a valve 24A, and the supply pipe 22A is provided with a pump 25A (corresponding to a back-surface-side pump) and a valve 26A. Hereinafter, the pumps 23A and 25A are referred to as sub-pumps 23A and 25A, respectively. The valve 24A switches opening and closing of the supply pipe 21A, and the valve 26A switches opening and closing of the supply pipe 22A. The sub-pump 23A feeds ink from the sub-tank 20A to the front surface printing unit 13A, and the sub-pump 25A feeds ink from the sub-tank 20A to the back surface printing unit 16A.

When the sub-pump 23A is operated with the valve 24A opened, the ink from the sub-tank 20A flows inside the supply pipe 21A and is supplied to the front surface printing unit 13A. When the sub-pump 25A is operated with the valve 26A opened, the ink from the sub-tank 20A flows inside the supply pipe 22A and is supplied to the back surface printing unit 16A.

The sub-tank 20B is connected to a front surface printing unit 13B via a supply pipe 21B, and is connected to a back surface printing unit 16B via a supply pipe 22B. The supply pipe 21B is provided with a pump 23B (corresponding to the front-surface-side pump) and a valve 24B, and the supply pipe 22B is provided with a pump 25B (corresponding to the back-surface-side pump) and a valve 26B. Hereinafter, the pumps 23B and 25B are referred to as sub-pumps 23B and 25B, respectively. The valve 24B switches opening and closing of the supply pipe 21B, and the valve 26B switches opening and closing of the supply pipe 22B. The sub-pump 23B feeds ink from the sub-tank 20B to the front surface printing unit 13B, and the sub-pump 25B feeds ink from the sub-tank 20B to the back surface printing unit 16B.

When the sub-pump 23B is operated with the valve 24B opened, the ink from the sub-tank 20B flows inside the supply pipe 21B and is supplied to the front surface printing unit 13B. When the sub-pump 25B is operated with the valve 26B opened, the ink from the sub-tank 20B flows inside the supply pipe 22B and is supplied to the back surface printing unit 16B.

The main tank 40 stores ink, and supplies (replenishes) the ink to each sub-tank 20. As with the sub-tanks 20, the main tank 40 also includes multiple tanks that stores respective types of ink. For example, the main tank 40 includes four tanks that are each for storing the corresponding one of the ink for black (K), the ink for cyan (C), the ink for magenta (M), and the ink for yellow (Y). Hereinafter, a tank of one color will be mainly described for simplicity of description.

The main tank 40 has a larger capacity than each sub-tank 20, the capacity being several times or more, desirably ten times or more, larger than a capacity of the sub-tank 20, for example. For example, each sub-tank 20 has a capacity of 18 L (liter), and the main tank 40 has a capacity of 200 L (liter).

The main tank 40 is connected to one end of a common pipe 31. The main tank 40 supplies ink to the common pipe 31. The common pipe 31 is commonly connected at the other end to one end of a branch pipe 32A and one end of a branch pipe 32B. The common pipe 31 is provided to supply ink to the branch pipes 32A and 32B. The branch pipe 32A is connected at the other end to the sub-tank 20A, and the branch pipe 32B is connected at the other end to the sub-tank 20B. The branch pipe 32A is provided to supply ink to the sub-tank 20A, and the branch pipe 32B is provided to supply ink to the sub-tank 20B. The common pipe 31 is provided with a pump (referred to below as a main pump) 33, the branch pipe 32A is provided with a valve 34A, and the branch pipe 32B is provided with a valve 34B. The valve 34A switches opening and closing of the branch pipe 32A, and the valve 34B switches opening and closing of the branch pipe 32B.

When the main pump 33 is operated with the valve 34A opened, the ink from the main tank 40 flows inside the common pipe 31 and the branch pipe 32A, and is supplied to the sub-tank 20A. This causes the sub-tank 20A to be replenished with the ink. When the main pump 33 is operated with the valve 34B opened, the ink from the main tank 40 flows inside the common pipe 31 and the branch pipe 32B, and is supplied to the sub-tank 20B. This causes the sub-tank 20B to be replenished with the ink.

As described above, the printing apparatus 100 is configured to cause the single main pump 33 to supply ink from the single main tank 40 to the plurality of sub-tanks 20A and 20B. Thus, the printing apparatus 100 can be simplified in configuration and can be reduced in manufacturing cost as compared with a configuration in which a pump corresponding to each of the plurality of sub-tanks 20 is provided.

The printing unit 10 in the example of FIG. 1 is provided with a central control unit 50. Specifically, the printing unit 10A is provided with a central control unit 50A, and the printing unit 10B is provided with a central control unit 50B. The central control unit 50A converts image data to be printed by the printing unit 10A into print image data for printing. The printing unit 10A performs print processing based on the print image data to print the print image data on the continuous paper sheet WP. Here, the print image data includes print image data for a front surface and print image data for a back surface. The central control unit 50B converts image data to be printed by the printing unit 10B into print image data for printing. The printing unit 10B performs the print processing based on the print image data to print the print image data on the continuous paper sheet WP. The print image data printed by the printing units 10A and 10B may be different from each other.

The central control units 50A and 50B are connected to each other in a wired or wireless manner to be able to communicate with each other, and transmit and receive various types of information as described later.

The example of FIG. 1 includes tank-side control units 27 provided corresponding the respective sub-tanks 20. That is, the tank-side control units 27A and 27B are provided corresponding to the sub-tanks 20A and 20B, respectively. The tank-side control unit 27A controls the sub-pumps 23A and 25A, and the valves 24A, 26A, and 34A. The tank-side control unit 27B controls the sub-pumps 23B and 25B, and the valves 24B, 26B, and 34B. The example of FIG. 1 includes a tank-side control unit 42 provided corresponding the main tank 40. The tank-side control unit 42 controls the pump 33. The tank-side control units 27 and 42 control these to control supply of ink from the main tank 40 to the sub-tank 20 and supply of ink from the sub-tank 20 to the printing unit 10. The pump 33 may be controlled by the tank-side control unit 27.

The central control unit 50 determines which of the sub-tanks 20A and 20B is to be preferentially supplied with ink from the main tank 40. This point will be described in detail later.

In the following description, components distinguished by reference signs A and B may be referred to by eliminating the reference signs A and B. For example, when the sub-pumps 23A and 23B do not need to be distinguished from each other, they may be referred to as a sub-pump 23.

<Printing Unit 10>

Figure 2:
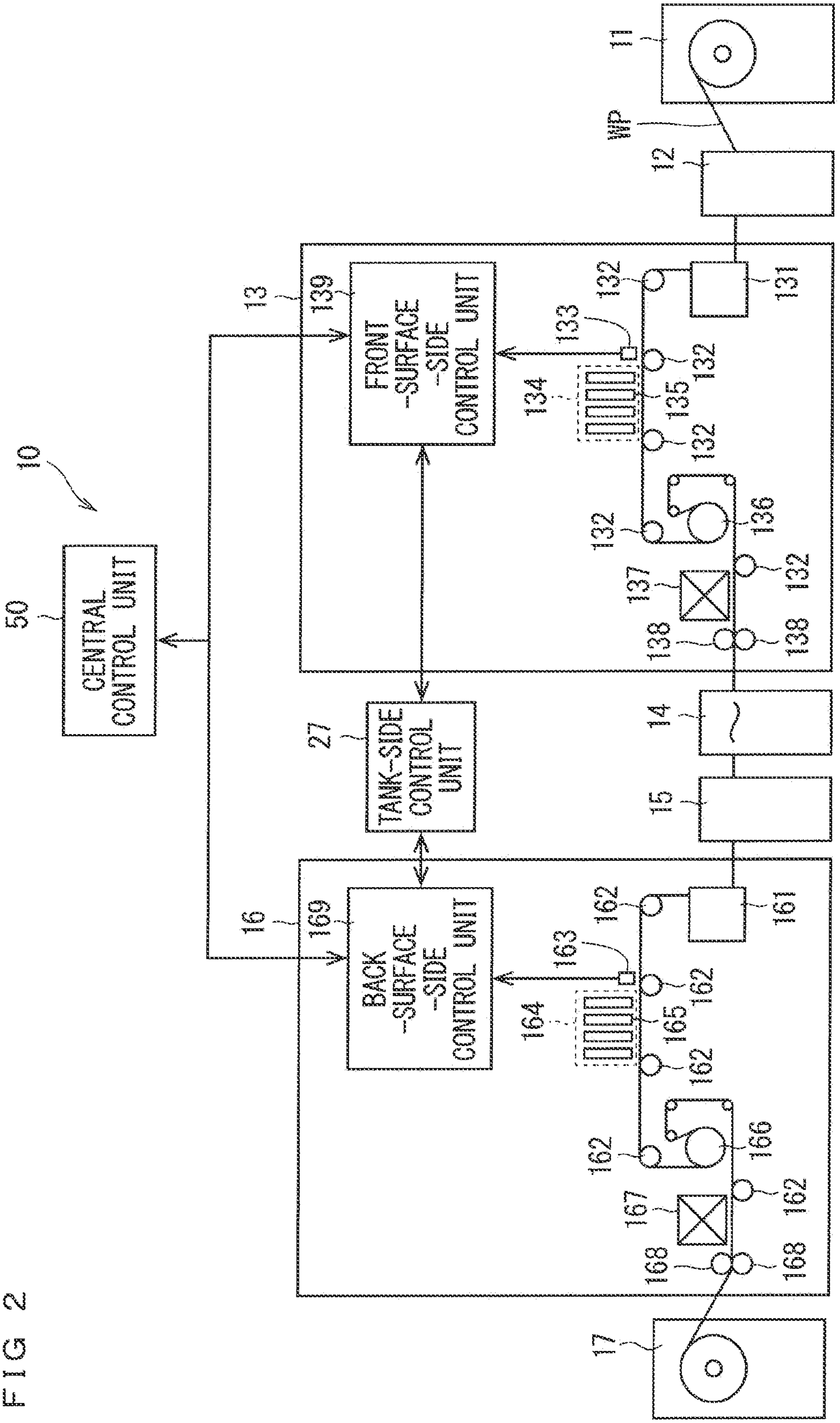
FIG. 2 is a diagram schematically illustrating an example of a configuration of a printing unit.

FIG. 2 is a diagram schematically illustrating an example of a configuration of the printing unit 10. The printing unit 10 includes a sheet feeder 11, a temperature adjuster 12, a front surface printing unit 13, a turnover device 14, a cooler 15, a back surface printing unit 16, and a sheet ejector 17.

The sheet feeder 11 holds the continuous paper sheet WP in a roll state, which is an example of a print medium, in a rotatable manner about a horizontal axis, and winds out and supplies the continuous paper sheet WP to the temperature adjuster 12. The continuous paper sheet WP to be supplied has a temperature substantially equal to environmental temperature at which the sheet feeder 11 is installed. Here, the temperature is 25° C., for example. The temperature adjuster 12 is a device capable of performing both heating and cooling on the continuous paper sheet WP. The front surface printing unit 13 is, for example, an inkjet printing apparatus configured to eject ink droplets to form an image, and performs printing on the front surface of the continuous paper sheet WP. The turnover device 14 includes a plurality of turn bars (not illustrated) and inverts the continuous paper sheet WP. As a result, the back surface of the continuous paper sheet WP faces upward. The cooler 15 cools the continuous paper sheet WP printed by the front surface printing unit 13 and inverted by the turnover device 14. The back surface printing unit 16 has, for example, a configuration similar to that of the front surface printing unit 13, and performs printing on the back surface of the continuous paper sheet WP. The sheet ejector 17 winds the continuous paper sheet WP processed by the front surface printing unit 13 and the back surface printing unit 16 in a roll state about the horizontal axis.

The front surface printing unit 13 is provided on an upstream side with a driving roller 131 for taking in the continuous paper sheet WP from the temperature adjuster 12. The continuous paper sheet WP heated or cooled by the temperature adjuster 12 is conveyed downstream along a plurality of conveying rollers 132 by the driving roller 131. The front surface printing unit 13 includes a driving roller 138 at the most downstream thereof. Between the driving roller 131 and the driving roller 138, a temperature sensor 133, a first printing unit 134, a first heat roller 136, and an inspection unit 137 are disposed from the upstream side. The temperature sensor 133 is installed between the temperature adjuster 12 and the first printing unit 134 to measure paper surface temperature of the continuous paper sheet WP when the front surface is printed. Examples of the temperature sensor 133 include a non-contact temperature sensor. The first printing unit 134 includes an inkjet printing head 135. A front-surface-side control unit 139 performs control such that a measured temperature of the continuous paper sheet WP reaches a target temperature by adjusting a first set temperature of the temperature adjuster 12 based on a measured temperature of the temperature sensor 133. The first set temperature is for a heating medium, and the target temperature is 30° C., for example. The first heat roller 136 incorporates a heat source, and heats the continuous paper sheet WP wound around an outer peripheral surface of the first heat roller 136 to dry a printed surface of the continuous paper sheet WP. The inspection unit 137 inspects an image printed on the continuous paper sheet WP.

The first printing unit 134 includes four printing heads 135, for example. Specifically, a printing head 135 for black (K), a printing head 135 for cyan (C), a printing head 135 for magenta (M), and a printing head 135 for yellow (Y) are provided in order from the upstream side. The respective printing heads 135 are disposed at predetermined intervals along a conveyance direction of the continuous paper sheet WP.

Each printing head 135 ejects ink supplied from the sub-tank 20 onto the continuous paper sheet WP to perform printing. Between the sub-tank 20 and the printing head 135, a buffer tank (not illustrated) having a smaller capacity than the sub-tank 20 may be provided.

The front-surface-side control unit 139 controls not only the driving roller 138 but also the printing head 135. The front-surface-side control unit 139 is communicatively connected to the central control unit 50 in a wired or wireless manner, and receives print image data for the front surface from the central control unit 50. The front-surface-side control unit 139 controls the printing head 135 based on the print image data for the front surface. As a result, ink is applied to the front surface of the continuous paper sheet WP according to the print image data for the front surface.

The back surface printing unit 16 has a configuration that is substantially similar to that of the front surface printing unit 13 described above. Specifically, the back surface printing unit 16 includes a driving roller 161, a conveying roller 162, a temperature sensor 163, a second printing unit 164 having a printing head 165, a second heat roller 166, an inspection unit 167, a driving roller 168, and a back-surface-side control unit 169. These components are similar to the respective components of the front surface printing unit 13.

The second printing unit 164 of the back surface printing unit 16 performs printing on the back surface of the continuous paper sheet WP cooled by the cooler 15. The temperature sensor 163 is installed between the cooler 15 and the second printing unit 164 to measure paper surface temperature of the continuous paper sheet WP when the back surface is printed. The back-surface-side control unit 169 performs control such that a measured temperature of the continuous paper sheet WP reaches a target temperature by adjusting a second set temperature of the cooler 15 based on a measured temperature of the temperature sensor 163. The second set temperature is a temperature of a refrigerant. As a result, the continuous paper sheet WP dried by the first heat roller 136 and having a temperature of 40° C., for example, is cooled to 30° C. The second set temperature of the cooler 15 in this case is set to 20° C. The second heat roller 166 incorporates a heat source, and heats the continuous paper sheet WP wound around an outer peripheral surface of the second heat roller 166 to dry a printed surface of the continuous paper sheet WP.

Each printing head 165 ejects ink supplied from the sub-tank 20 onto the continuous paper sheet WP to perform printing. Between the sub-tank 20 and the printing head 165, a buffer tank (not illustrated) having a smaller capacity than the sub-tank 20 may be provided.

The back-surface-side control unit 169 controls not only the driving roller 168 but also the printing head 165. The back-surface-side control unit 169 is communicatively connected to the central control unit 50 in a wired or wireless manner, and receives print image data for the back surface from the central control unit 50. The back-surface-side control unit 169 controls the printing head 165 based on the print image data for the back surface. As a result, ink is applied to the back surface of the continuous paper sheet WP according to the print image data for the back surface.

Figure 3:
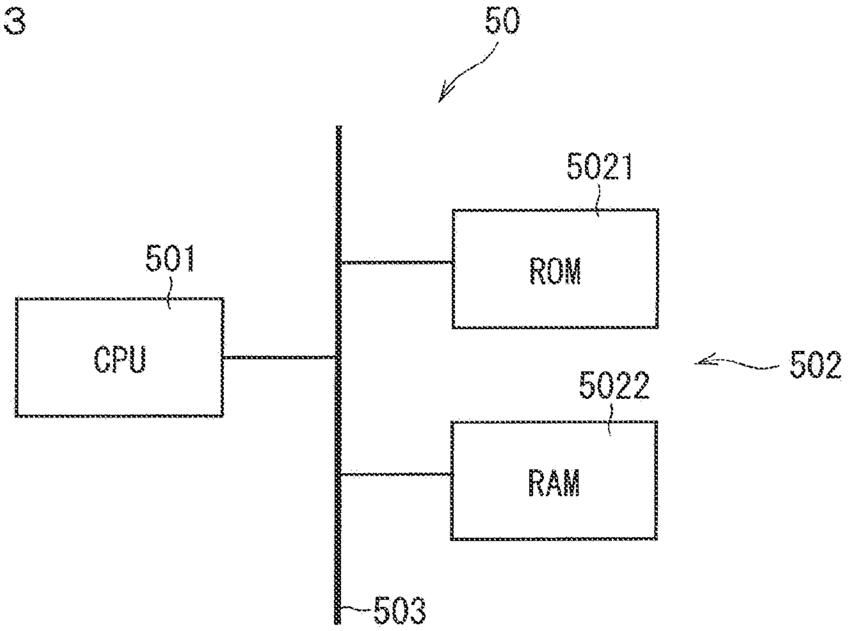
FIG. 3 is a diagram schematically illustrating an example of an internal configuration of a control unit.

Each of the control units 50, 27, 42, 139, and 169 can also be referred to as a control circuit. FIG. 3 is a diagram schematically illustrating an example of an internal configuration of the central control unit 50. The control unit 50 includes an arithmetic processing unit 501 and a storage medium 502. The arithmetic processing unit 501 includes a processing device such as a central processing unit (CPU). The storage medium 502 includes a non-transitory storage medium 5021 and a transitory storage medium 5022, for example. Examples of the non-transitory storage medium 5021 include a memory such as a read only memory (ROM). Examples of the transitory storage medium 5022 include a memory such as a random access memory (RAM). The arithmetic processing unit 501 and the storage medium 502 in the example of FIG. 3 are connected to each other by a bus 503. The various components described above electrically connected to the central control unit 50 are connected to the bus 503 directly or via a communication circuit.

The non-transitory storage medium 5021 stores a program to be executed by the arithmetic processing unit 501. When the arithmetic processing unit 501 executes the program, the central control unit 50 can execute various functions. Alternatively, some or all of the functions executed by the central control unit 50 may be implemented by a hardware circuit that does not require software such as a program. The control units 27, 42, 139, and 169 each may also have a configuration similar to that of the central control unit 50.

<Liquid Feeding Ability of Pump>

The printing apparatus 100 is configured such that each sub-tank 20 supplies ink to the corresponding printing unit 10 (the front surface printing unit 13 and the back surface printing unit 16). The amount of ink supplied from the sub-tank 20 increases or decreases in accordance with the amount of ink ejected onto the continuous paper sheet WP by each printing unit 10. Specifically, as a printing rate of print image data increases, the printing unit 10 ejects more ink on the continuous paper sheet WP, and accordingly, the amount of ink supplied from each sub-tank 20 to the printing unit 10 also increases. As described above, as the printing rate in the print image data increases, more ink is supplied from the sub-tank 20 to the printing unit 10, and thus the amount of remaining ink in the sub-tank 20 decreases at a high speed. The printing rate may also be referred to as image density.

Referring to FIG. 1, the sub-pump 23A that supplies ink from the sub-tank 20A to the front surface printing unit 13A has liquid feeding ability to the extent that the ink can be sufficiently supplied to the front surface printing unit 13A even when the front surface printing unit 13A performs print processing at a printing rate of 100%. The liquid feeding ability here means a flow rate of ink that can be supplied by a pump. Similarly, the sub-pump 25A also has the liquid feeding ability to the extent that ink can be sufficiently supplied to the back surface printing unit 16A even when the back surface printing unit 16A performs print processing at a printing rate of 100%. Thus, as long as the ink is stored in the sub-tank 20A, the sub-pumps 23A and 25A can continue to appropriately supply the ink to the front surface printing unit 13A and the back surface printing unit 16A, respectively. The same applies to the liquid feeding ability of each of the sub-pumps 23B and 25B.

In contrast, the ink is supplied (replenished) from the main tank 40 to the plurality of sub-tanks 20A and 20B by the single main pump 33. Here, there is considered a case where the liquid feeding ability of the main pump 33 is equal to or greater than the sum total of the liquid feeding ability of each of the sub-pumps 23 and 25 in the plurality of printing units 10. That is, there is considered a case where the liquid feeding ability of the main pump 33 is equal to or greater than the sum total of the liquid feeding ability of each of the sub-pumps 23A, 23B, 25A, and 25B. In this case, even when both of the printing units 10A and 10B perform the print processing at the printing rate of 100%, the ink can be supplied from the main tank 40 to the sub-tanks 20A and 20B without causing the sub-tanks 20A and 20B to run out of the ink. The printing rate of 100% in the printing unit 10 means that the front surface printing unit 13 and the back surface printing unit 16 of the printing unit 10 perform print processing on the front surface and the back surface of the continuous paper sheet WP at the printing rate of 100%, respectively.

Although the pump 33 having a high liquid feeding ability can avoid shortage of the ink in the sub-tank 20, the main pump 33 having the high liquid feeding ability is expensive and large in size. It is also considered that all of the plurality of printing units 10 continue to perform printing at the printing rate of 100% for a short period in many cases. That is, even when a pump having liquid feeding ability equal to or greater than the sum total of the liquid feeding ability of each of the sub-pumps 23 and 25 of the plurality of printing units 10 is selected as the main pump 33, there is little opportunity to utilize the liquid feeding ability.

When the printing unit 10 is additionally provided, the sub-pumps 23 and 25 are also increased in number accordingly. This addition may cause the liquid feeding ability of the main pump 33 to decrease to lower than the sum total of the liquid feeding ability of each of the sub-pumps 23 and 25 of the plurality of printing units 10.

Thus, the main pump 33 in the present embodiment is described in which the main pump 33 has liquid feeding ability selected to be less than the sum total of the liquid feeding ability of each of the sub-pumps 23 and 25 of the plurality of printing units 10. In this case, the printing units 10A and 10B each having a high printing rate may cause a total amount of remaining ink in the sub-tanks 20A and 20B to gradually decrease as time elapses due to shortage of the liquid feeding ability of the main pump 33 even when the ink is supplied from the main tank 40 to the sub-tanks 20A and 20B.

However, the main pump 33 may have the liquid feeding ability set to be equal to or greater than the sum of the liquid feeding ability of each of the sub-pumps 23 and 25 in one printing unit 10. When the sub-pumps 23A and 25A are different from the sub-pumps 23B and 25B in the sum of the liquid feeding ability, the main pump 33 may have liquid feeding ability set to be equal to or greater than the larger sum. This setting enables the main pump 33 to supply the ink to the sub-tank 20 without causing the ink to run out in the sub-tank 20 corresponding to the printing unit 10 when only one printing unit 10 performs print processing at the printing rate of 100%.

Hereinafter, a plurality of examples will be described for a method of determining which one of the sub-tanks 20A and 20B is to be preferentially supplied with ink. The sub-tank 20 in the present embodiment is supplied with ink when the amount of remaining ink in the sub-tank 20 becomes equal to or less than a refill reference value (e.g., 17 L).

<Priority Determination: Amount of Remaining Ink>

Hereinafter, a method for supplying ink in a situation where the amount of remaining ink in each of the sub-tanks 20A and 20B is smaller than the refill reference value (e.g., 17 L) will be described.

The central control unit 50 determines which of the plurality of sub-tanks 20 is to be preferentially supplied with ink from the main tank 40 based on the amount of remaining ink in the sub-tanks 20A and 20B, for example. That is, the central control unit 50 determines the priority of the plurality of sub-tanks 20 based on the amount of remaining ink in the sub-tanks 20A and 20B.

As illustrated in FIG. 1, the sub-tank 20 is provided with a remaining amount sensor 28 that measures the amount of remaining ink. The remaining amount sensor 28 measures the amount of ink stored in the sub-tank 20 (i.e., the amount of remaining ink), and outputs remaining amount information indicating a measurement result to a tank-side control unit 27. Specifically, a remaining amount sensor 28A measures the amount of remaining ink in the sub-tank 20A and outputs remaining amount information on the sub-tank 20A to the tank-side control unit 27A, and a remaining amount sensor 28B measures the amount of remaining ink in the sub-tank 20B and outputs remaining amount information on the sub-tank 20B to the tank-side control unit 27B.

The tank-side control unit 27 is communicatively connected to the central control unit 50 in a wired or wireless manner. In the example of FIG. 2, the tank-side control unit 27 is also communicatively connected to the front-surface-side control unit 139 and the back-surface-side control unit 169 in a wired or wireless manner, and communicates with the central control unit 50 via these components. As a matter of course, the tank-side control unit 27 may directly communicate with the central control unit 50. The tank-side control unit 27 transmits remaining amount information on the sub-tank 20 to the central control unit 50. Specifically, the tank-side control unit 27A transmits the remaining amount information on the sub-tank 20A to the central control unit 50A, and the tank-side control unit 27B transmits the remaining amount information on the sub-tank 20B to the central control unit 50B.

The central control unit 50 compares the amount of remaining ink of each of the sub-tanks 20A and 20B based on both the remaining amount information, and determines to preferentially supply the ink to the sub-tank 20 having a smaller amount of remaining ink. That is, the central control unit 50 determines the priority of the sub-tank 20 having a smaller amount of remaining ink to be higher than the priority of the sub-tank 20 having a larger amount of remaining ink. The central control unit 50 transmits priority information indicating the determination result to the tank-side control units 27A and 27B. The central control unit 50 (the central control unit 50A in the example of FIG. 1) is also communicatively connected to the tank-side control unit 42 in a wired or wireless manner, and instructs the tank-side control unit 42 to operate the pump 33.

The tank-side control units 27A and 27B control the valves 34A and 34B, respectively, based on the priority information. For example, the tank-side control units 27A and 27B open the valve 34 corresponding to the sub-tank 20 with high priority and close the valve 34 corresponding to the sub-tank 20 with low priority. The tank-side control unit 42 causes the pump 33 to operate. As a result, the ink is supplied from the main tank 40 to the sub-tank 20 with the high priority, and no ink is supplied to the sub-tank 20 with the low priority. Thus, the ink is preferentially supplied to the sub-tank 20 having a small amount of remaining ink.

Figure 4:
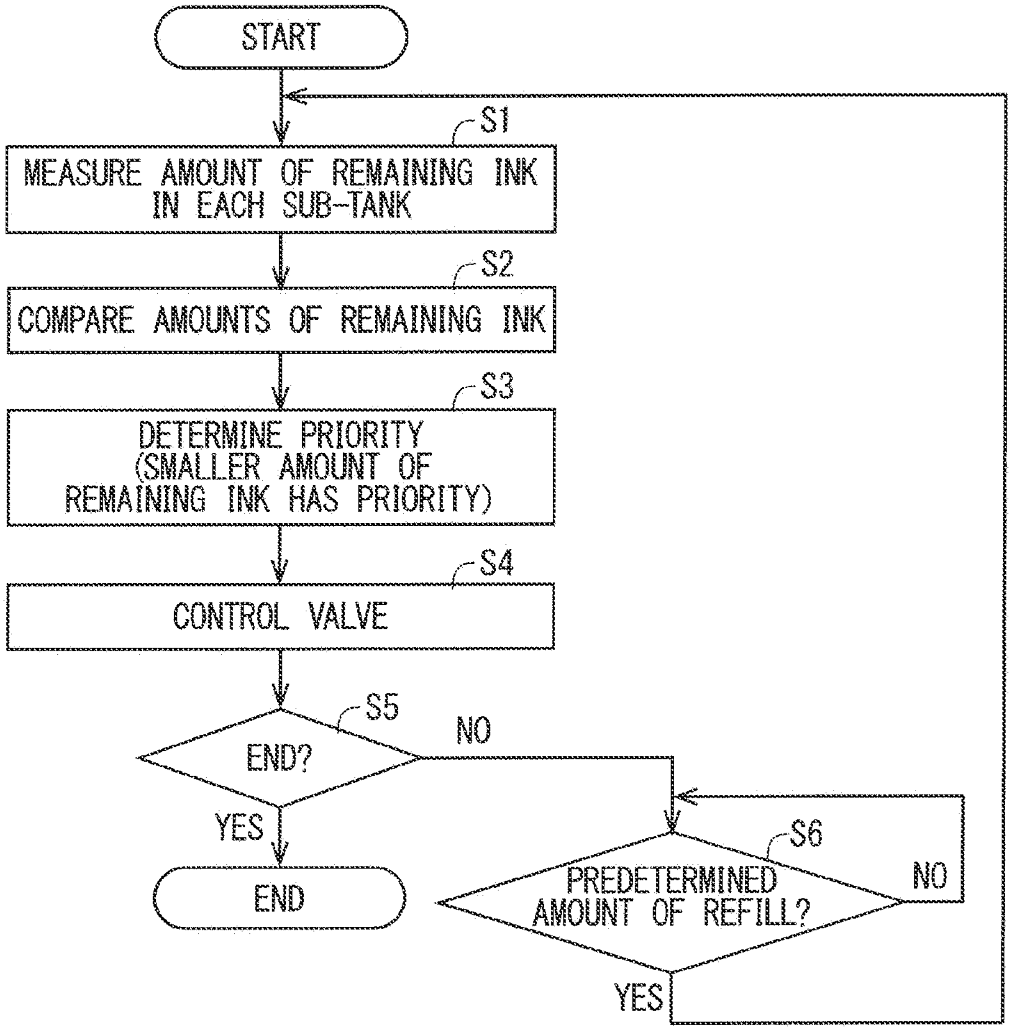
FIG. 4 is a flowchart illustrating an example of an ink supply process.

FIG. 4 is a flowchart illustrating an example of the ink supply process. First, the amount of remaining ink in each sub-tank 20 is measured (step S1). Specifically, the remaining amount sensors 28A and 28B measure the amount of remaining ink in the sub-tanks 20A and 20B, respectively, and output remaining amount information to the tank-side control units 27A and 27B, respectively. The tank-side control units 27A and 27B transmit the remaining amount information to the central control units 50A and 50B, respectively. One of the central control units 50A and 50B transmits the remaining amount information to the other. For example, the central control unit 50B transmits the remaining amount information on the sub-tank 20B to the central control unit 50A.

Next, the central control unit 50 (e.g., the central control unit 50A) compares the amounts of remaining ink in the respective sub-tanks 20 with each other based on the remaining amount information on each sub-tank 20 (step S2). Next, the central control unit 50 determines priority of each sub-tank 20 based on the comparison result (step S3). Specifically, the central control unit 50 determines the priority of the sub-tank 20 having a smaller amount of remaining ink to be higher than the priority of the other sub-tank 20. When the amount of remaining ink in the sub-tank 20A is smaller than the amount of remaining ink in the sub-tank 20B, the central control unit 50 sets the priority of the sub-tank 20A higher than the priority of the sub-tank 20B. The central control unit 50 transmits priority information indicating the priority to each tank-side control unit 27. For example, the central control unit 50A transmits the priority information to not only the tank-side control unit 27A but also the central control unit 50B. The central control unit 50B transmits the priority information to the tank-side control unit 27B.

Although in the above example, one of the central control units 50 determines the priority, both the central control units 50 may determine the priority. For example, the central control units 50 may transmit the remaining amount information to each other, and each of the central control units 50 may determine the priority as described above and transmit the priority information to the corresponding tank-side control unit 27. The same applies to other embodiments described later.

Next, the tank-side control unit 27 controls the valve 34 based on the priority information (step S4). To supply ink to the sub-tank 20 with high priority, the tank-side control unit 27 opens the valve 34 corresponding to the sub-tank 20 with high priority and closes the valve 34 corresponding to the sub-tank 20 with low priority. The tank-side control unit 42 causes the pump 33 to operate. Thus, the ink can be supplied to the sub-tank 20 having a small amount of remaining ink. As a result, the amount of remaining ink in the sub-tank 20 increases as time elapses.

Next, the central control unit 50 determines whether print processing of each of the printing units 10A and 10B has been completed (step S5). When the print processing is finished, processing is finished.

When the print processing has not been finished, the tank-side control unit 27 determines whether the amount of remaining ink in the sub-tank 20 at a supply destination has increased by a preset amount of refill (e.g., 1 L) (step S6). When an increment of ink is less than the amount of refill, the tank-side control unit 27 performs step S6 again. That is, the tank-side control unit 27 continues to open the corresponding valve 34 until the amount of refill of ink is supplied to the sub-tank 20 at the supply destination.

For example, a case where the amount of remaining ink in the sub-tank 20A is smaller than the amount of remaining ink in the sub-tank 20B will be described. In this case, the tank-side control unit 27A opens the valve 34A to supply the ink from the main tank 40 to the sub-tank 20A (step S4). As a result, the amount of remaining ink in the sub-tank 20A increases as time elapses. At this time, the valve 34A is maintained in an opened state until the amount of remaining ink in the sub-tank 20A increases by the preset amount of refill (step S6). That is, even when the amount of remaining ink in the sub-tank 20A increases to larger than the amount of remaining ink in the sub-tank 20B, the valve 34A is maintained in the opened state until an increment of the amount of remaining ink in the sub-tank 20A reaches the amount of refill. This configuration enables reducing switching frequency of the valves 34A and 34B.

When the increment of the amount of remaining ink is greater than or equal to the amount of refill in step S6, step S1 is performed again. As a result, the amount of remaining ink in the sub-tank 20 is compared again (steps S1 and S2), and the ink is supplied to the sub-tank 20 having a smaller amount of remaining ink at the time of comparison (steps S3 and S4).

Figure 5:
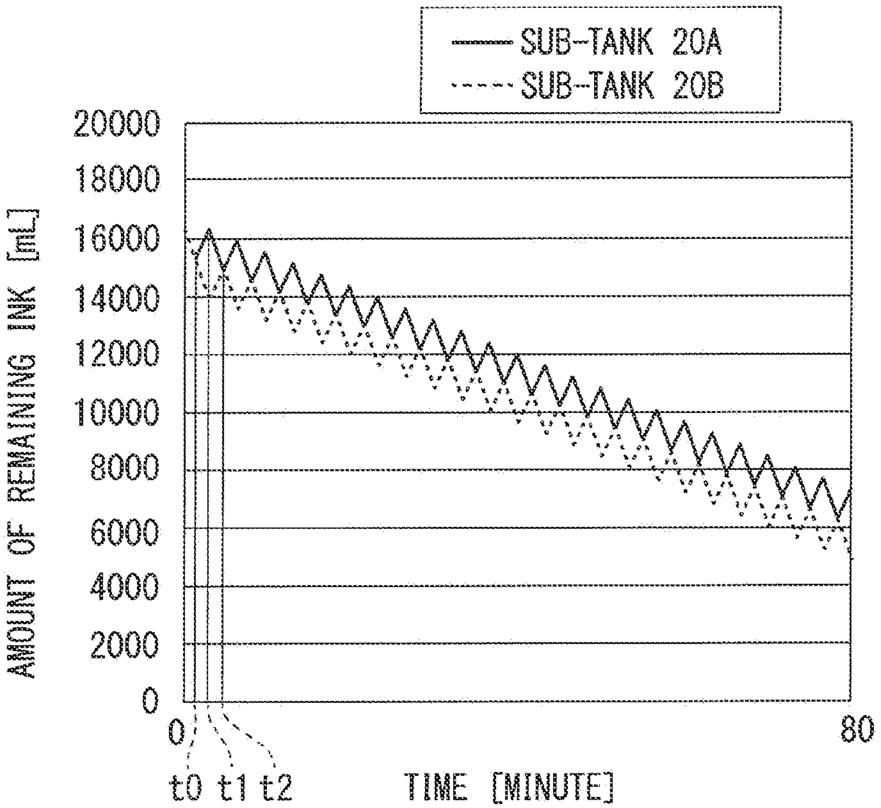
FIG. 5 is a graph showing an example of a temporal change in the amount of remaining ink in a sub-tank.

FIG. 5 is a graph showing an example of a temporal change in the amount of remaining ink in the ink supply process. FIG. 5 illustrates an example when the printing units 10A and 10B each perform the print processing at the printing rate of 100%. FIG. 5 is a graph in which temporal change of the amount of remaining ink in the sub-tank 20A is indicated by a solid line, and temporal change of the amount of remaining ink in the sub-tank 20B is indicated by a broken line.

In FIG. 5, the amount of remaining ink in each of the sub-tanks 20A and 20B is smaller than the refill reference value (here, 17 L). For example, at the time point t0, the amounts of remaining ink in the sub-tanks 20A and 20B are compared with each other (step S2). Here, it is assumed that the amount of remaining ink in the sub-tank 20A is slightly smaller than the amount of remaining ink in the sub-tank 20B. Thus, the central control unit 50 determines to preferentially supply the ink to the sub-tank 20A rather than the sub-tank 20B (step S3). In response to this determination, the tank-side control unit 27A opens the valve 34A, and the tank-side control unit 27B keeps the valve 34B closed (step S4). The tank-side control unit 42 causes the main pump 33 to operate. As a result, after the time point t0, the amount of remaining ink in the sub-tank 20A increases as time elapses, and the amount of remaining ink in the sub-tank 20B decreases as time elapses.

The main pump 33 has the liquid feeding ability less than the sum total of the liquid feeding ability of each of the sub-pumps 23 and 25 of the printing units 10A and 10B, so that a rate of decrease in the amount of remaining ink in the sub-tank 20B is higher than a rate of increase in the amount of remaining ink in the sub-tank 20A.

At a time point t1 when the amount of remaining ink in the sub-tank 20A increases by a predetermined amount of refill (here, 1 L), the amounts of remaining ink in the sub-tanks 20A and 20B are compared with each other again (step S2). At the time point t1, the amount of remaining ink in the sub-tank 20B is smaller than the amount of remaining ink in the sub-tank 20A, so that the central control unit 50 determines this time to preferentially supply ink to the sub-tank 20B rather than the sub-tank 20A (step S3). In response to this determination, the tank-side control unit 27A closes the valve 34A, and the tank-side control unit 27B opens the valve 34B (step S4). As a result, after the time point t1, the amount of remaining ink in the sub-tank 20B increases as time elapses, and the amount of remaining ink in the sub-tank 20A decreases as time elapses. The sub-tank 20A has a rate of decrease in the amount of remaining ink, the rate being higher than a rate of increase in the amount of remaining ink in the sub-tank 20B.

At a time point t2 when the amount of remaining ink in the sub-tank 20B increases by a predetermined amount of refill, the amounts of remaining ink in the sub-tanks 20A and 20B are compared with each other again (step S2). At the time point t2, the amount of remaining ink in the sub-tank 20A is slightly smaller than the amount of remaining ink in the sub-tank 20B. Thus, the central control unit 50 determines again to preferentially supply the ink to the sub-tank 20A rather than the sub-tank 20B (step S3). In response to this determination, the tank-side control unit 27A opens the valve 34A, and the tank-side control unit 27B closes the valve 34B (step S4). As a result, after the time point t2, the amount of remaining ink in the sub-tank 20A increases as time elapses, and the amount of remaining ink in the sub-tank 20B decreases as time elapses. Thereafter, similar operation is repeated.

The rate of decrease in the amount of remaining ink is higher than the rate of increase in the amount of remaining ink, so that the amount of remaining ink gradually decreases as a whole, as time elapses. In contrast, the example described above is configured such that the amounts of remaining ink of the sub-tanks 20A and 20B are repeatedly compared with each other, and each time, the ink is preferentially supplied to the sub-tank 20 having a smaller amount of remaining ink. This configuration enables preventing the amount of remaining ink in one of the sub-tanks 20 from decreasing unevenly with respect to that in the other. In other words, a difference in the amount of remaining ink between the sub-tanks 20A and 20B can be maintained within a predetermined range. Thus, the printing units 10A and 10B can continue to perform the print processing for a similar period of time. In other words, a period of time during which both the printing units 10A and 10B can operate in parallel can be lengthened.

The tank-side control unit 27 in the above example controls the valves 34A and 34B exclusively for each other. However, the present invention is not necessarily limited thereto. For example, when the valve 34 is capable of adjusting a flow rate of ink, the ink can be preferentially supplied to the sub-tank 20 having a smaller amount of remaining ink while both the valves 34A and 34B are opened. For example, the tank-side control unit 27 may control the valve 34 so that a flow rate of the valve 34 corresponding to the sub-tank 20 with high priority increases to more than a flow rate of the valve 34 corresponding to the sub-tank 20 with low priority. The same applies to other embodiments described later.

This configuration also enables a larger amount of ink to be supplied to the sub-tank 20 having a smaller amount of remaining ink. Thus, the amount of remaining ink in one of the sub-tanks 20 can be prevented from decreasing unevenly with respect to that in the other.

The flow rate of the ink may be controlled by adjusting an opening degree of the valve 34, or may be controlled by adjusting duty of opening and closing of the valve 34.

<Priority Determination: Print Status>

The central control unit 50 in the above example determines the priority according to magnitude of the amount of remaining ink in the sub-tanks 20A and 20B. However, the present invention is not necessarily limited thereto. For example, when only one of the printing units 10A and 10B performs the print processing, the central control unit 50 may determine to preferentially supply ink to the sub-tank 20 corresponding to the one of the printing units 10 regardless of the amount of remaining ink in the sub-tanks 20A and 20B.

The central control unit 50 also can transmit print image data to each of the front-surface-side control unit 139 and the back-surface-side control unit 169 of the printing unit 10 to instruct printing. Thus, the central control unit 50 manages print status information indicating whether the printing unit 10 performs print processing. The central control unit 50 accordingly may determine the priority of the sub-tank 20 based on the print status information.

For example, the central control unit 50B may transmit print status information on the printing unit 10B to the central control unit 50A. The central control unit 50A determines the priority of the sub-tank 20 based on print status information on the printing units 10A and 10B. Specifically, when one of the printing units 10A and 10B is during the print processing and the other is not during the print processing, the central control unit 50A determines to preferentially supply ink to the sub-tank 20 corresponding to the one printing unit 10. In other words, the central control unit 50A determines the priority of the sub-tank 20 corresponding to the one printing unit 10 to be higher than the priority of the other sub-tank 20.

Figure 6:
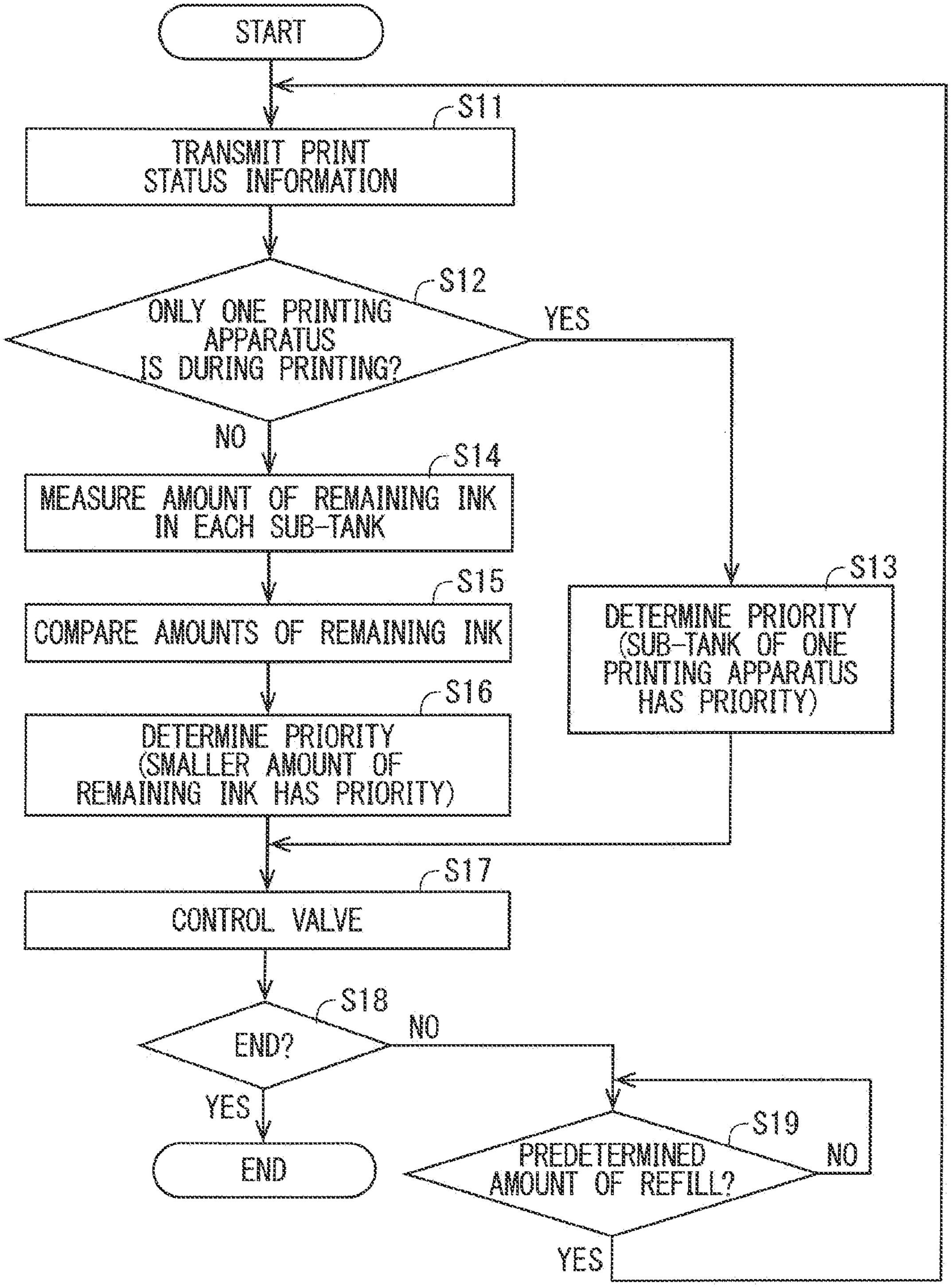
FIG. 6 is a flowchart illustrating another example of the ink supply process.

FIG. 6 is a flowchart illustrating an example of the ink supply process. First, the central control unit 50 transmits print status information (step S11). For example, the central control unit 50B transmits the print status information on the printing unit 10B to the central control unit 50A. Next, the central control unit 50 (e.g., the central control unit 50A) determines whether only one of the printing units 10A and 10B performs print processing based on the print status information (step S12).

When only one printing unit 10 performs the print processing, the central control unit 50 determines to preferentially supply ink to the sub-tank 20 corresponding to the one printing unit 10 rather than the sub-tank 20 corresponding to the other printing unit 10 (step S13). That is, regardless of the amount of remaining ink in the sub-tanks 20A and 20B, the ink is preferentially supplied to the sub-tank 20 corresponding to the printing unit 10 during the print processing. The central control unit 50 transmits information on the priority to the tank-side control unit 27, and instructs the tank-side control unit 42 to operate the pump 33.

When a negative determination (NO) is made in step S12, steps S14 to S16 are performed. Steps S14 to S16 are similar to steps S1 to S3, respectively. That is, when both the printing units 10A and 10B perform the print processing, the priority is determined based on the magnitude of the amount of remaining ink in the sub-tanks 20A and 20B as described above.

Subsequent to step S13 or step S16, the tank-side control units 27A and 27B control the valves 34A and 34B, respectively, according to information on the priority (step S17). Step S17 is similar to step S4. The tank-side control unit 42 causes the pump 33 to operate. Next, steps S18 and S19 similar to steps S5 and S6, respectively, are performed.

According to the above processing, when only one printing unit 10 is during print processing, the ink is preferentially supplied to the sub-tank 20 of the one printing unit 10 (steps S12, S13, and S17). This configuration enables reducing possibility that ink runs out in the sub-tank 20 for one printing unit 10. The other printing unit 10 is not during the print processing, so that ink does not run out in the other sub-tank 20.

When both the printing units 10 are during the print processing, the ink is preferentially supplied to the sub-tank 20 having a smaller amount of remaining ink (steps S12, and S14 to S17). Thus, the amount of remaining ink in one of the sub-tanks 20 can be prevented from decreasing unevenly with respect to that in the other of the sub-tanks 20.

In the above processing, when only one printing unit 10 is during the print processing and the other printing unit 10 is not during the print processing, the ink is preferentially supplied to the sub-tank 20 of the one printing unit 10. Alternatively, when only one printing unit 10 is during the print processing based on print image data and the other printing unit 10 is in another state, the ink may be preferentially supplied to the sub-tank 20 of the one printing unit 10. Examples of a state except during the print processing based on the print image data include a case of performing test printing for checking an operation state of each of printing heads 135 by ejecting ink from the corresponding one of the printing heads 135 onto the continuous paper sheet WP. The examples also include a case where each of the printing heads 135 performs recovery processing such as flushing, cleaning, or capping. As a result, the print processing of the print image data by one printing unit 10 can be preferentially continued.

<Priority Determination: Ink Request Order>

When the printing units 10A and 10B are during the print processing and the amounts of remaining ink of the sub-tanks 20A and 20B are equal to or less than the refill reference value and are substantially equal to each other, the ink may be preferentially supplied to one of the sub-tanks 20A and 20B that needs to be refilled first. In other words, the ink may be preferentially supplied to one of the sub-tanks 20A and 20B that has requested the ink first.

Here, the central control unit 50 determines that the sub-tank 20 needs to be supplied with ink when the amount of remaining ink is equal to or less than the refill reference value (here, 17 L). That is, the central control unit 50 determines that the sub-tank 20 requests the ink when the amount of remaining ink becomes equal to or less than the refill reference value. The central control unit 50 stores (overwrites) timing (referred to below as refill necessary timing) at which the amount of remaining ink becomes equal to or less than the refill reference value in the storage medium 502. The refill necessary timing can be measured by a timer circuit (not illustrated). As a result, the central control unit 50 can store the refill necessary timing for each sub-tank 20.

Figure 7:
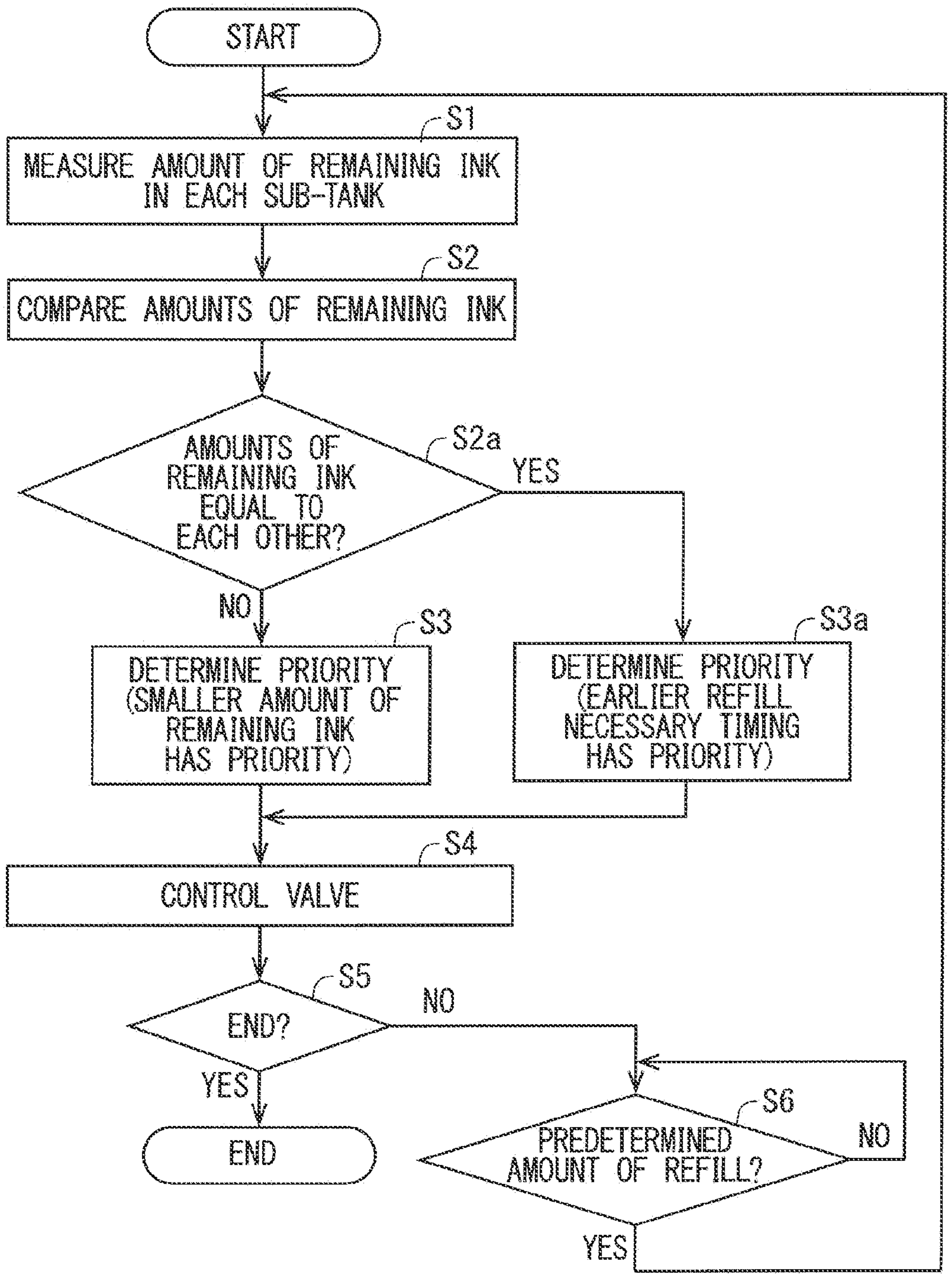
FIG. 7 is a flowchart illustrating yet another example of the ink supply process.

FIG. 7 is a flowchart illustrating an example of the ink supply process. FIG. 7 illustrates a flow in which steps S2*a* and S3*a* are further performed as compared with the flow of FIG. 4. Step S2*a* is performed after step S2. In step S2*a*, the central control unit 50 determines whether the amounts of remaining ink in the sub-tanks 20A and 20B are substantially equal to each other. The amounts of remaining ink being substantially equal to each other mean that a difference between the amounts of remaining ink is smaller than a predetermined difference reference value. The difference reference value is set in advance, for example.

When the amounts of remaining ink are substantially equal to each other, the central control unit 50 compares the refill necessary timings of the sub-tanks 20A and 20B with each other, and determines to preferentially supply the ink to the sub-tank 20 having an earlier refill necessary timing (step S3*a*). That is, the central control unit 50 determines the priority of the sub-tank 20 in which the amount of remaining ink falls below the refill reference value first to be higher than the priority of the sub-tank 20 in which the amount of remaining ink falls below the refill reference value later.

In contrast, when the amounts of remaining ink are different from each other in step S2*a*, the central control unit 50 determines to preferentially supply the ink to the sub-tank 20 having a smaller amount of remaining ink (step S3). Subsequent to step S3 or step S3*a*, steps S4 to S6 are performed.

According to the above processing, when the amounts of remaining ink in the sub-tanks 20A and 20B are substantially equal to each other, the ink can be preferentially supplied to the sub-tank 20 that first requires a refill of the ink.

<Priority Determination: Point System>

The central control unit 50 may calculate the priority of the sub-tank 20 by introducing numerical values corresponding to the print status information, the amount of remaining ink, and an ink request order, and adding the numerical values. The ink request order means temporal order in which the sub-tank 20 is required to be refilled with the ink. That is, the ink request order means order in which the amount of remaining ink falls below the refill reference value.

For example, there are introduced a numerical value β1 corresponding to the print status information, a numerical value β2 corresponding to the amount of remaining ink, and a numerical value β3 corresponding to the ink request order. The numerical value β1 is set such that the numerical value β1 when the printing unit 10 is during print processing is larger than the numerical value β1 when the printing unit 10 is not during the print processing. The numerical value β2 is set to be larger as the amount of remaining ink decreases. The numerical value β3 is set such that the numerical value β3 for the sub-tank 20 having an earlier request for ink is larger than the numerical value β3 for the sub-tank 20 having a later request for the ink.

The central control unit 50 calculates the priority of the sub-tank 20 by totaling the numerical values β1 to β3, for example. That is, the priority of the sub-tank 20A is calculated by totaling the numerical value β1 for the printing unit 10A and the numerical values β2 and β3 for the sub-tank 20A, and the priority of the sub-tank 20B is calculated by totaling the numerical value β1 for the printing unit 10B and the numerical values β2 and β3 for the sub-tank 20B. The central control unit 50 determines to preferentially supply the ink to the sub-tank 20 with high priority.

<Priority Determination: Amount of Consumption of Ink>

Next, a method for determining priority of the sub-tank 20 based on an estimated value of the amount of future consumption of ink in the printing unit 10 will be described. Hereinafter, an estimated value of the amount of consumption of ink is referred to as an estimated amount of consumption of ink.

Figure 8:
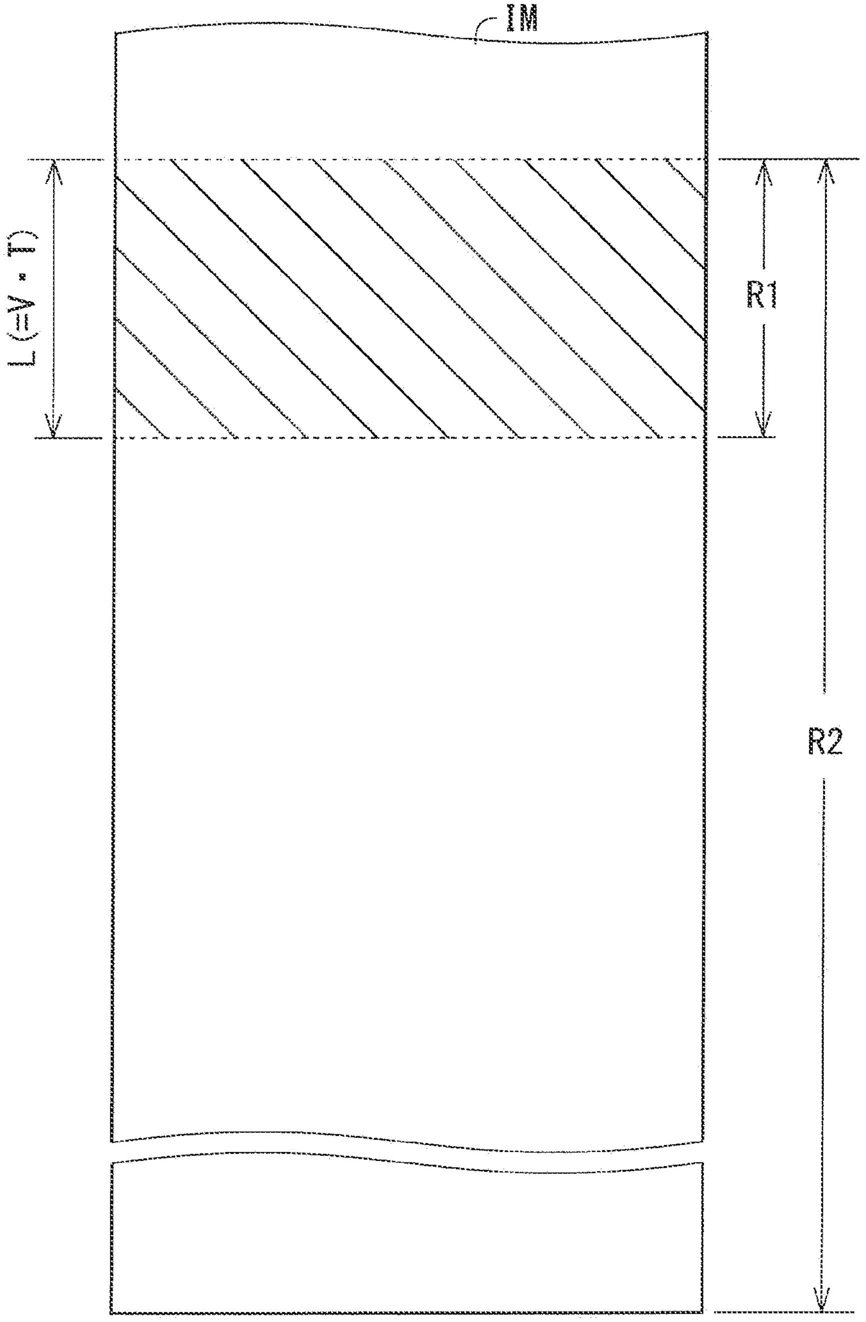
FIG. 8 is a diagram illustrating an example of print image data.

The central control unit 50 calculates the estimated amount of consumption of ink consumed in each printing unit 10 based on print image data of each printing unit 10, for example. More specifically, the central control unit 50 calculates the estimated amount of consumption of ink consumed in each printing unit 10 until a predetermined period T elapses from the current time point. FIG. 8 is a diagram schematically illustrating an example of a part of print image data, which is referred to below as print image data IM, printed by the printing unit 10. FIG. 8 illustrates the print image data IM in which a region R1 to be printed in the predetermined period T is indicated by hatching with oblique lines. Printing has not been yet performed on the region R1, and is performed in the predetermined period T immediately after the region R1. The region R1 has a length L that is a length of the region R1 in a conveyance direction of the continuous paper sheet WP, and is indicated by the product (V·T) of conveyance speed V of the continuous paper sheet WP and the predetermined period T. The conveyance speed V is set in advance, for example.

The central control unit 50 obtains an estimated amount of consumption of ink in the region R1 in the print image data IM of the printing unit 10 based on the print image data IM. The estimated amount of consumption of ink can be calculated by any method. However, for example, when a pixel value of a pixel of each color of the print image data IM indicates the amount of ink, the central control unit 50 may obtain the estimated amount of consumption of ink for each color based on a sum total of pixel values for each color in the region R1. Here, the printing unit 10 includes the front surface printing unit 13 and the back surface printing unit 16, and thus the central control unit 50 obtains the estimated amount of consumption of ink in the printing unit 10 based on the pixel value in the region R1 of the print image data IM for the front surface and the pixel value in the region R1 of the print image data IM for the back surface.

The central control unit 50 determines which of the sub-tanks 20A and 20B is to be preferentially supplied with the ink in the predetermined period T based on the estimated amount of remaining ink of each of the printing units 10A and 10B. Specifically, the central control unit 50 determines to preferentially supply the ink to the sub-tank 20 corresponding to the printing unit 10 having a large estimated amount of remaining ink.

Figure 9:
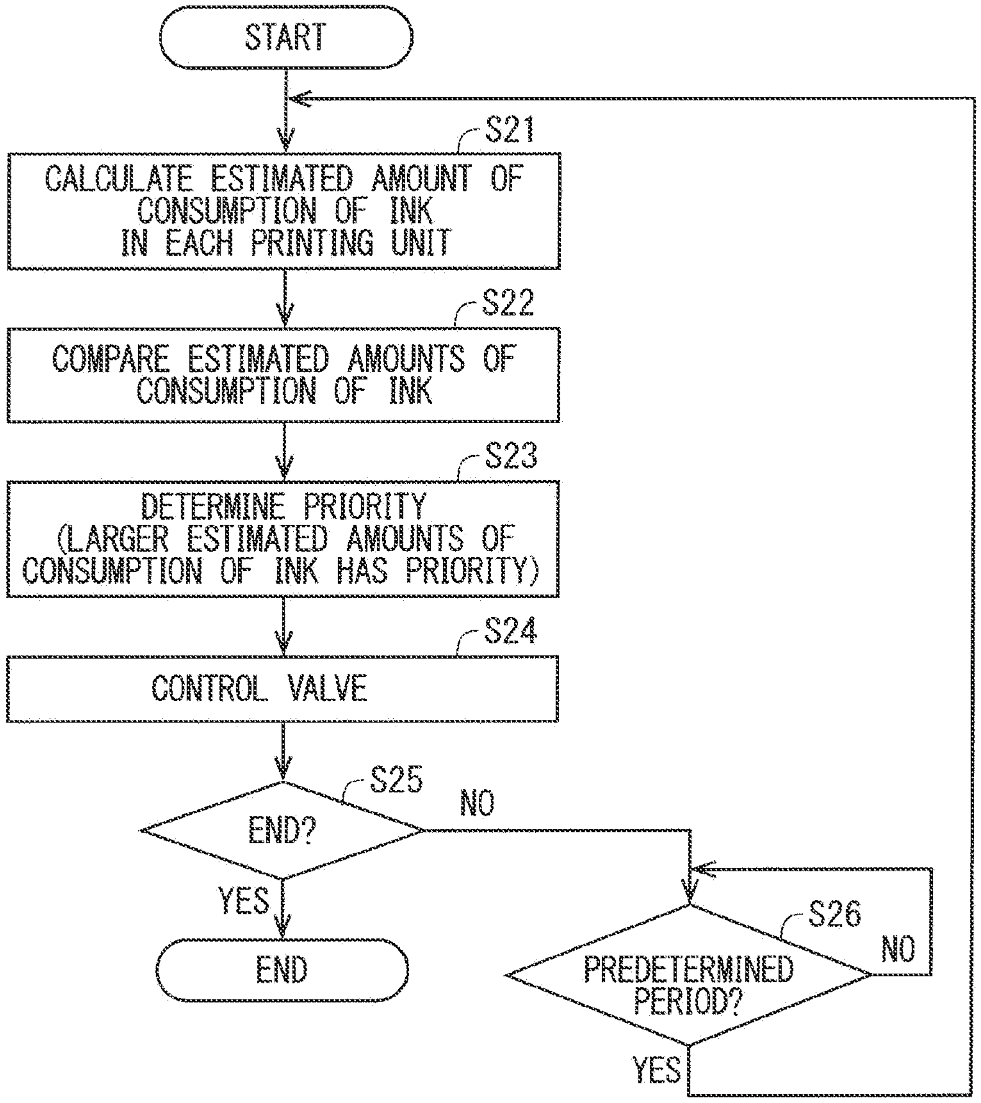
FIG. 9 is a flowchart illustrating yet another example of the ink supply process.

FIG. 9 is a flowchart illustrating an example of the ink supply process. First, the central control units 50A and 50B respectively calculate estimated amounts of consumption of ink consumed by the printing units 10A and 10B until the predetermined period T elapses from the current point of time (step S21). The predetermined period T is set in advance, and can be set to several seconds to several minutes, for example.

One of the central control units 50 transmits estimated consumption information indicating the estimated amount of consumption of ink to the other. For example, the central control unit 50B transmits the estimated consumption information on the printing unit 10B to the central control unit 50A.

Next, the central control unit 50 (e.g., the central control unit 50A) compares the estimated amounts of consumption of ink in the printing units 10A and 10B with each other (step S22). Subsequently, the central control unit 50 determines to which one of the sub-tanks 20A and 20B the ink is to be preferentially supplied based on a result of the comparison (step S23). Specifically, the central control unit 50 determines to preferentially supply the ink to the sub-tank 20 corresponding to the printing unit 10 having a larger estimated amount of consumption of ink. In other words, the central control unit 50 sets the priority of the sub-tank 20 corresponding to the printing unit 10 having the larger estimated amount of consumption of ink to be higher than the priority of the sub-tank 20 corresponding to the other printing unit 10. The central control unit 50 transmits priority information indicating the priority to the tank-side control unit 27. The central control unit 50 also instructs the tank-side control unit 42 to operate the pump 33.

Next, the tank-side control unit 27 controls the valve 34 based on the priority information (step S24). Specifically, the tank-side control unit 27 opens the valve 34 corresponding to the sub-tank 20 with high priority and closes the valve 34 corresponding to the sub-tank 20 with low priority in the next predetermined period T. The tank-side control unit 42 causes the pump 33 to operate. As a result, the ink is supplied to the sub-tank 20 corresponding to the printing unit 10 having a large estimated amount of consumption of ink in the predetermined period T.

Next, the central control unit 50 determines whether the print processing of both the printing units 10A and 10B is finished (step S25). When the print processing is finished, processing is finished. When the print processing is not finished, the central control unit 50 determines whether the predetermined period T has elapsed from a start of valve control in step S24 (step S26). When the predetermined period T has not elapsed, step S26 is performed again. When the predetermined period T has elapsed, step S21 is performed again. That is, an open or close state of the valve 34 is maintained to maintain supply of ink to the sub-tank 20 with high priority in the predetermined period T.

According to the above processing, the ink is preferentially supplied to the sub-tank 20 corresponding to the printing unit 10 having a larger estimated amount of consumption of ink in the predetermined period T. Thus, the sub-tank 20 with the amount of remaining ink that is more greatly reduced in the predetermined period T can be preferentially refilled with the ink in the predetermined period T. This configuration enables reducing possibility that ink runs out in the sub-tank 20.

<Priority Determination: Estimated Amount of Remaining Ink>

The central control unit 50 may estimate the amount of future remaining ink in the sub-tank 20 to determine the priority of the sub-tank 20 based on the estimated value. First, the central control unit 50 obtains an estimated value of the amount of remaining ink in the sub-tank 20 after elapse of the predetermined period T. The estimated value of the amount of remaining ink here is an estimated value of the amount of remaining ink in the sub-tank 20 when it is assumed that the ink is not supplied to the sub-tank 20. Hereinafter, this estimated value is referred to as an estimated amount of remaining ink.

The central control unit 50 calculates the estimated amount of remaining ink after elapse of the predetermined period T by subtracting an estimated amount of consumption of ink in the printing unit 10 in the predetermined period T from a current amount of remaining ink in the sub-tank 20 measured by the remaining amount sensor 28. The estimated amount of consumption of ink is calculated as described above. The central control unit 50 determines to preferentially supply the ink to the sub-tank 20 having a smaller estimated amount of remaining ink.

Figure 10:
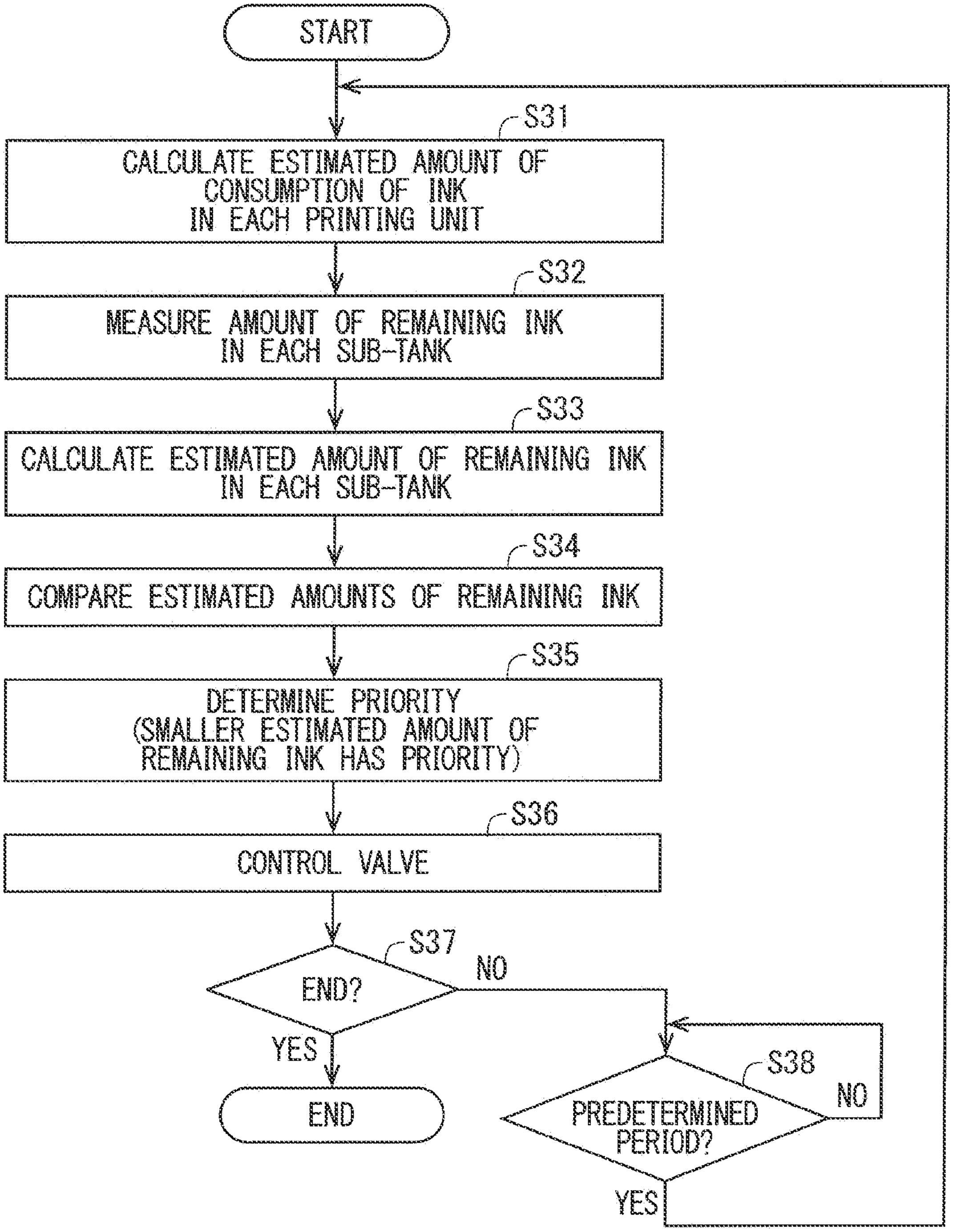
FIG. 10 is a flowchart illustrating yet another example of the ink supply process.

FIG. 10 is a flowchart illustrating an example of the ink supply process. First, each central control unit 50 calculates the estimated amount of consumption of ink in each printing unit 10 in the next predetermined period T (step S31). Step S31 is similar to step S21. Next, the current amount of remaining ink in each sub-tank 20 is measured (step S32). Step S32 is similar to step S1. Next, the central control unit 50 calculates the estimated amount of remaining ink in each sub-tank 20 after elapse of the predetermined period T based on the amount of remaining ink and the estimated amount of consumption of ink (step S33). Specifically, the central control unit 50A calculates the estimated amount of remaining ink in the sub-tank 20A by subtracting the estimated amount of consumption of ink in the printing unit 10A in the next predetermined period T from the current amount of remaining ink in the sub-tank 20A. The same applies to the sub-tank 20B. One of the central control units 50 transmits estimated remaining amount information indicating the estimated amount of remaining ink to the other. For example, the central control unit 50B transmits the estimated remaining amount information on the sub-tank 20B to the central control unit 50A.

Next, the central control unit 50 (e.g., the central control unit 50A) compares estimated amounts of remaining ink in the sub-tanks 20A and 20B with each other (step S34). Subsequently, the central control unit 50 determines which of the sub-tanks 20A and 20B is to be preferentially supplied with the ink based on a result of the comparison (step S35). Specifically, the central control unit 50 determines to preferentially supply the ink to the sub-tank 20 having a smaller estimated amount of remaining ink. In other words, the central control unit 50 sets the priority of the sub-tank 20 having a smaller estimated amount of remaining ink to be higher than the priority of the sub-tank 20 having a larger estimated amount of remaining ink. The central control unit 50 transmits priority information indicating the priority to the tank-side control unit 27. The central control unit 50 also instructs the tank-side control unit 42 to operate the pump 33.

Next, the tank-side control unit 27 controls the valve 34 based on the priority information (step S36). Step S36 is similar to step S24. Specifically, the tank-side control unit 27 opens the valve 34 corresponding to the sub-tank 20 having a smaller estimated amount of remaining ink and closes the other valve 34 in the next predetermined period T. Next, steps S37 and S38 similar to steps S25 and S26, respectively, are performed.

The above processing enables the ink to be preferentially supplied to the sub-tank 20, which has a smaller estimated amount of remaining ink after elapse of the predetermined period T, in the predetermined period T (steps S31 to S36). Thus, the amount of remaining ink in one of the sub-tanks 20 can be reliably prevented from decreasing unevenly with respect to that in the other of the sub-tanks 20.

<Priority Determination: Estimated Total Amount of Consumption of Ink>

The central control unit 50 may calculate not only an estimated amount of consumption of ink in each printing unit 10 in the next predetermined period T but also an estimated value of the amount of ink to be consumed by printing in a remaining region R2 (see also FIG. 8) in the print image data IM. Hereinafter, the estimated value of the amount of consumption of ink in this region R2 is referred to as an estimated total amount of consumption of ink. A method for calculating the estimated total amount of consumption of ink is similar to that for calculating the estimated amount of consumption of ink.

The central control unit 50 compares the current amount of remaining ink in the sub-tank 20 measured by the remaining amount sensor 28 with the estimated total amount of consumption of ink in the printing unit 10 corresponding to the sub-tank 20. The amount of remaining ink larger than the estimated total amount of consumption of ink means that printing in the region R2 in the print image data IM can be covered by the current amount of remaining ink in the sub-tank 20. This case causes low urgency of ink supply to the sub-tank 20. Thus, the central control unit 50 may determine to preferentially supply the ink to the other sub-tank 20.

Figure 11:
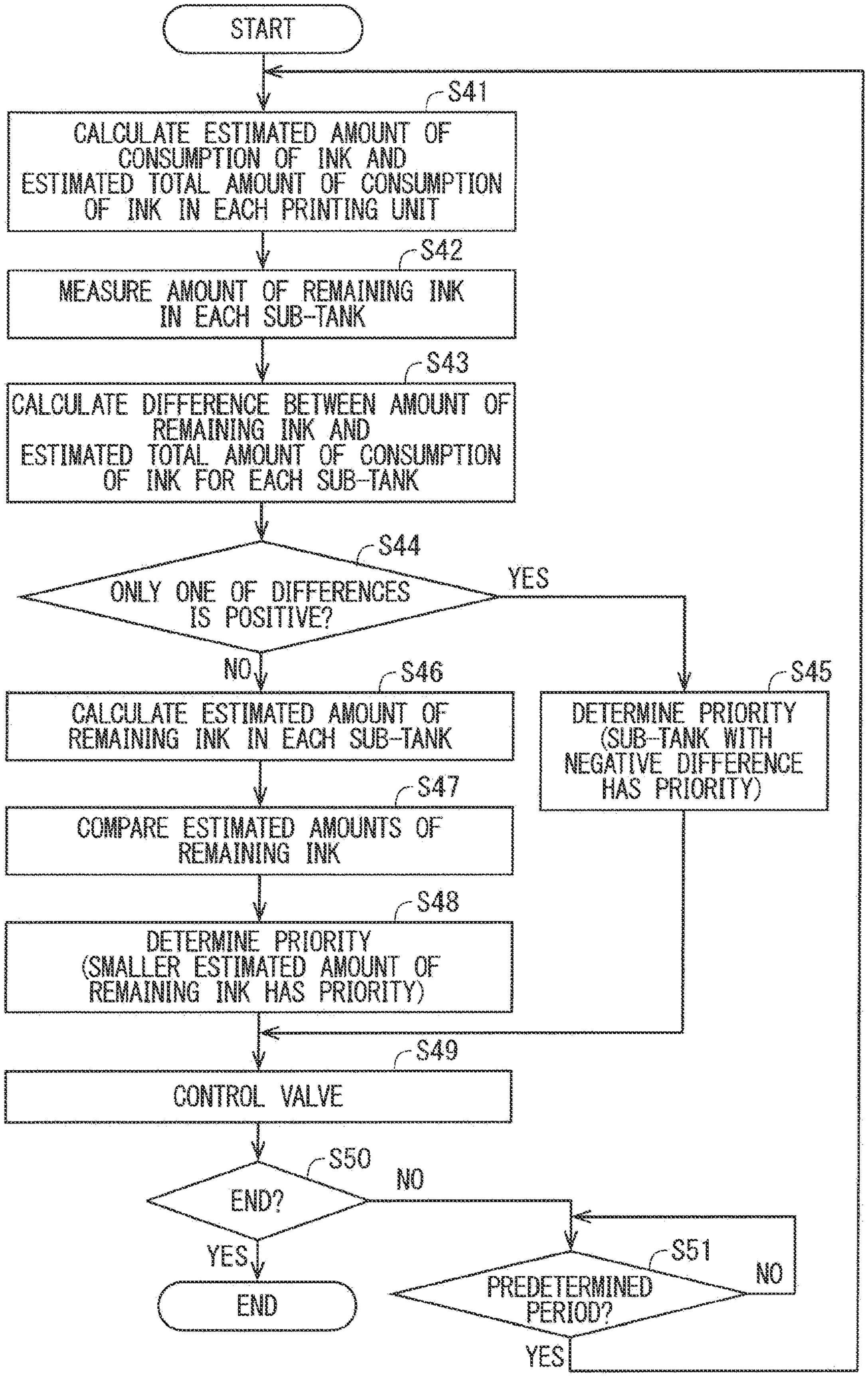
FIG. 11 is a flowchart illustrating yet another example of the ink supply process.

FIG. 11 is a flowchart illustrating an example of the ink supply process. As in step S31, each central control unit 50 first calculates not only the estimated amount of consumption of ink in the corresponding one of the printing units 10 in the next predetermined period T, but also the estimated total amount of consumption of ink in the corresponding one of the printing units 10 (step S41). The estimated total amount of consumption of ink for the region R2 is calculated similarly to the estimated total amount of consumption of ink for the region R1.

Next, the amount of remaining ink in each sub-tank 20 is measured (step S42). Step S42 is similar to step S32. Next, the central control unit 50 calculates a difference between the amount of remaining ink and the estimated total amount of consumption of ink for each sub-tank 20 (step S43). Specifically, the central control unit 50A calculates the difference (first value) by subtracting the estimated total amount of consumption of ink in the printing unit 10A from the amount of remaining ink in the sub-tank 20A, and the central control unit 50B calculates the difference (second value) by subtracting the estimated total amount of consumption of ink in the printing unit 10B from the amount of remaining ink in the sub-tank 20B.

The difference being positive means that the ink stored in the sub-tank 20 is enough for the printing unit 10 to print the remaining region R2. The difference being negative means that the ink stored in the sub-tank 20 is not enough for the printing unit 10 to print the remaining region R2. That is, when the difference is positive, the sub-tank 20 is not necessarily required to be refilled with the ink, and when the difference is negative, the sub-tank 20 is required to be refilled with the ink.

One of the central control units 50 transmits information indicating the difference to the other. For example, the central control unit 50B transmits information indicating the difference in the sub-tank 20B to the central control unit 50A.

Next, the central control unit 50 (e.g., the central control unit 50A) determines whether only one of the differences in the respective sub-tanks 20A and 20B is positive (step S44). When only the one of the differences is positive, the central control unit 50 determines to preferentially supply the ink to the sub-tank 20 in which the difference is negative (step S45). That is, the central control unit 50 determines the priority of the sub-tank 20 in which the difference is negative to be higher than the priority of the sub-tank 20 in which the difference is positive. In short, the ink is preferentially supplied to the sub-tank 20 required to be refilled with the ink for printing on the remaining region R2 in the print image data IM.

When a negative determination (NO) is made in step S44, steps S46 to S48 similar to steps S33 to S35 are performed. That is, the ink is preferentially supplied to the sub-tank 20 having a smaller estimated amount of remaining ink.

Subsequent to step S45 or step S48, the tank-side control unit 27 controls the valve 34 based on the priority information (step S49). Step 49 is similar to step S36. The tank-side control unit 42 causes the pump 33 to operate. Next, steps S50 and S51 similar to steps S37 and S38, respectively, are performed.

According to the above processing, when one sub-tank 20 stores the amount of ink required to finish the printing of the print image data IM and the other sub-tank 20 does not store the amount of ink required to finish the printing of the print image data IM, the ink is preferentially supplied to the other sub-tank 20. This configuration does not cause the one sub-tank 20 to run out of the ink, and can also reduce a possibility that the other sub-tank 20 runs out of the ink.

In contrast, when the ink required to finish the printing of the print image data IM is not stored in both the sub-tanks 20, the ink is preferentially supplied to the sub-tank 20 having a lower estimated amount of remaining ink. This configuration enables preventing the amount of remaining ink in one of the sub-tanks 20 from decreasing unevenly with respect to that in the other.

<Priority Determination: Weighting>

Figure 12:
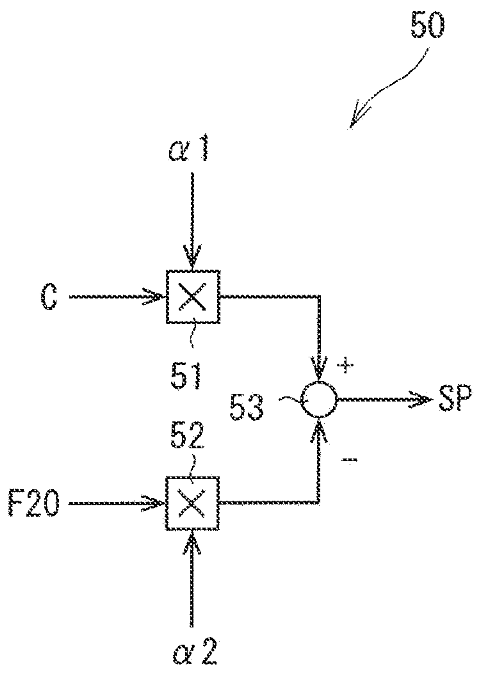
FIG. 12 is a block schematically illustrating an example of a configuration for determining priority.

Next, another example of priority determination using the amount of remaining ink and the estimated amount of consumption of ink will be described. The central control unit 50 may weight the current amount of remaining ink in the sub-tank 20 and the estimated amount of consumption of ink in the printing unit 10 in the next predetermined period T to calculate the priority of the sub-tank 20. FIG. 12 is a functional block diagram schematically illustrating an example of a configuration for calculating priority, which is also referred below to as a priority SP, of the sub-tank 20. For example, the central control unit 50 includes multipliers 51 and 52 and a subtractor 53.

The multiplier 51 receives a weighting coefficient $\alpha 1$ and an estimated amount of consumption of ink, which is also referred to below as an estimated amount C of consumption of ink, in the next predetermined period T. The weighting coefficient $\alpha 1$ is set in advance, for example. The multiplier 51 outputs the product ($\alpha 1 \cdot C$) of the weighting coefficient $\alpha 1$ and the estimated amount C of consumption of ink to the subtractor 53. The multiplier 52 receives a weighting coefficient α2 and the amount of remaining ink, which is also referred below to as an amount F20 of remaining ink, in the sub-tank 20 measured by the remaining amount sensor 28. The weighting coefficient α2 is set in advance, for example. The multiplier 52 outputs the product (α2·F 20) of the weighting coefficient α2 and the amount F20 of remaining ink to the subtractor 53. The subtractor 53 outputs a value obtained by subtracting the product (α2·F 20) from the product (α1·C) as the priority SP. This is expressed by Expression (1) below.

$$SP=\alpha 1\cdot C-\alpha 2\cdot F20 \quad (1)$$

The priority SP increases as the estimated amount C of consumption of ink increases and the amount F20 of remaining ink decreases.

The central control unit 50 calculates the priority SP for each sub-tank 20. For example, the central control unit 50A calculates the priority SP of the sub-tank 20A by substituting the amount F20 of remaining ink in the sub-tank 20A and the estimated amount C of consumption of ink in the printing unit 10A into Expression (1), and the central control unit 50B calculates the priority SP of the sub-tank 20B by substituting the amount F20 of remaining ink in the sub-tank 20B and the estimated amount C of consumption of ink in the printing unit 10B into Expression (1).

The central control unit 50 compares the priority SP of the sub-tank 20A with the priority SP of the sub-tank 20B, and determines to preferentially supply the ink to the sub-tank 20 with the higher priority SP in the next predetermined period T.

This configuration enables appropriate setting for how to relatively emphasize the amount of remaining ink and the estimated amount of consumption of ink by appropriately adjusting the weighting coefficients α1 and α2.

<Priority Determination: Switching>

When the sub-tank 20 has a relatively large amount of remaining ink, the ink may be supplied to the sub-tank 20 based on the amount of remaining ink without using the estimated amount of consumption of ink, and when the sub-tank 20 has a relatively low amount of remaining ink, the ink may be supplied to the sub-tank 20 based on both the amount of remaining ink and the estimated amount of consumption of ink.

Figure 13:
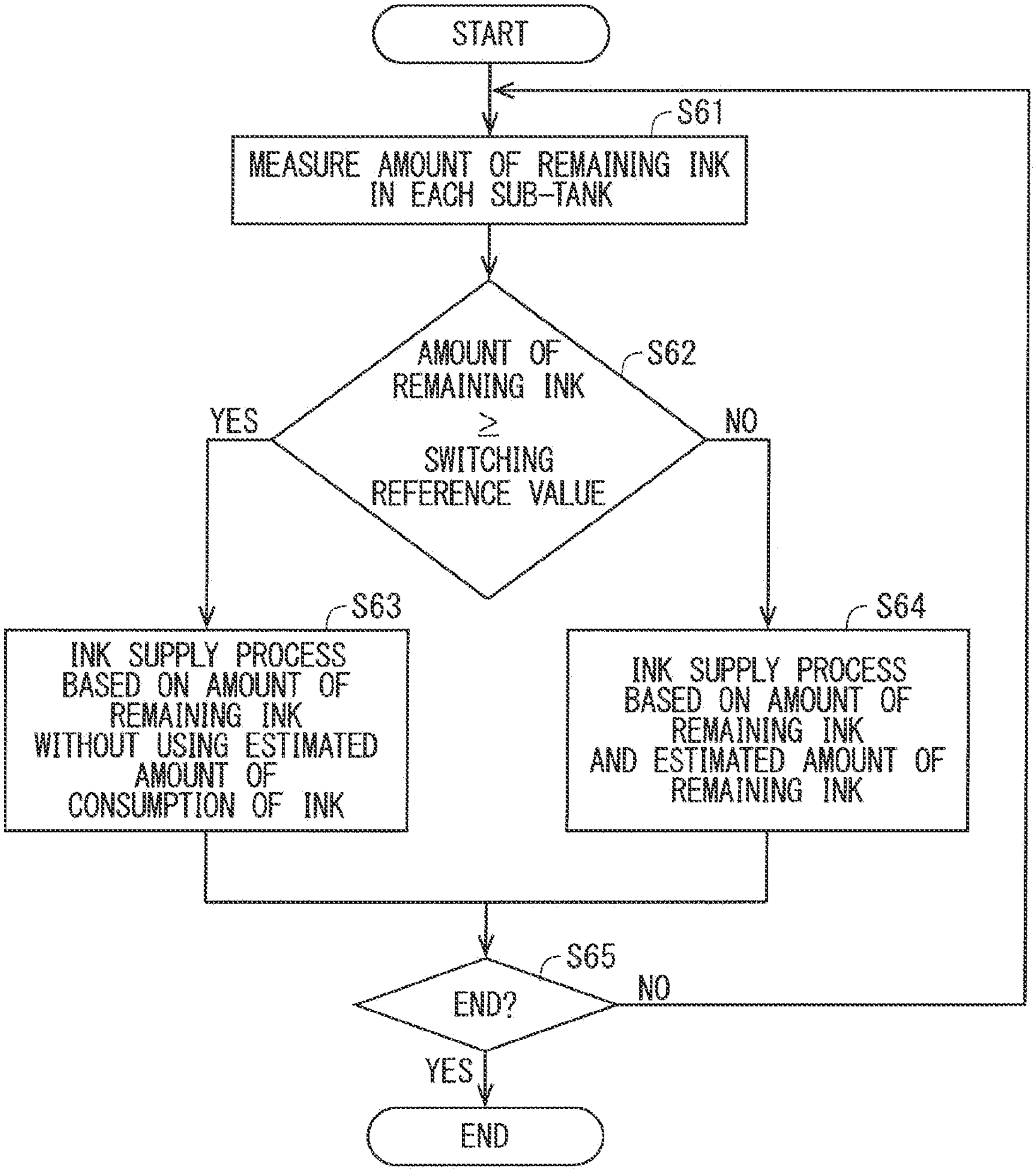
FIG. 13 is a flowchart illustrating yet another example of the ink supply process.

FIG. 13 is a flowchart illustrating an example of the ink supply process. First, the amount of remaining ink in the sub-tanks 20A and 20B is measured (step S61). Step S61 is similar to step 51.

Next, the central control unit 50 (e.g., the central control unit 50A) determines whether both the amounts of remaining ink of the sub-tanks 20A and 20B are equal to or more than a switching reference value (step S62). The switching reference value is smaller than the refill reference value, and is 5 L, for example. The switching reference value is set in advance, for example.

When both of the amounts of remaining ink are equal to or larger than the switching reference value, the central control unit 50 performs an ink supply process based on the amount of remaining ink without using the estimated amount of consumption of ink (step S63). This ink supply process is similar to the ink supply process described with reference to FIGS. 4 to 7. For example, the printing apparatus 100 preferentially supplies ink to the sub-tank 20 having a smaller amount of remaining ink.

In contrast, when at least one of the amounts of remaining ink is less than the switching reference value, the central control unit 50 performs an ink supply process based on the amount of remaining ink and the estimated amount of remaining ink (step S64). This ink supply process is similar to the ink supply process described with reference to FIGS. 8 to 12. For example, the printing apparatus 100 preferentially supplies ink to the sub-tank 20 having a smaller estimated amount of remaining ink.

This configuration enables reducing processing load of priority determination when both of the amounts of remaining ink are equal to or larger than the switching reference value. In contrast, this configuration enables increasing a period in which the printing units 10A and 10B can continue printing in parallel by preventing unevenness of the amount of remaining ink more reliably when at least one of the amounts of remaining ink is less than the switching reference value.

<Estimated Amount of Consumption of Ink: Number of Pages>

In the above example, the central control unit 50 calculates the estimated amount of consumption of ink in the predetermined period T based on the pixel value of each color in the region R1 of the print image data IM, and calculates the estimated total amount of consumption of ink based on the pixel value of each color in the region R2 of the print image data IM. Alternatively, the central control unit 50 may calculate the estimated amount of consumption of ink and the estimated total amount of consumption of ink more simply. For example, the estimated amount of consumption of ink and the estimated total amount of consumption of ink may be calculated based on the number of pages (including a decimal fraction) in the region R1 or the region R2 of the print image data IM. Specifically, the central control unit 50 may calculate the estimated amount of consumption of ink or the estimated total amount of consumption of ink by multiplying the number of pages by a predetermined coefficient.

<Estimated Amount of Consumption of Ink: Maintenance Processing>

The printing unit 10 may consume ink in processing different from the print processing. Examples of the processing include maintenance processing such as flushing processing. The flushing processing is for ejecting ink from the printing head 135 or 165 to improve a state of an ejection orifice of the printing head 135 or 165. The examples of the processing also include processing in which a suction device is brought into contact with the ejection orifice of the printing head 135 or 165 and the suction device sucks the ink.

As described above, when the maintenance processing of consuming ink is scheduled, the central control unit 50 may obtain the estimated amount of consumption of ink including the amount of consumption of ink used in the maintenance processing. Timing at which the maintenance processing is performed may be set in advance. For example, the maintenance processing may be performed at least at any timing at which the printing unit 10 is started or finished, or the print processing is started or finished. The amount of ink consumed in the maintenance processing may also be set in advance, for example.

For example, when only the maintenance processing is performed in the printing unit 10 in the next predetermined period T, the central control unit 50 sets the amount of consumption of ink, which is set in advance, as the estimated amount of consumption of ink in the printing unit 10. When both the maintenance processing and the print processing are performed by the printing unit 10 in the next predetermined period T, the central control unit 50 calculates a sum of the amount of consumption of ink used in the maintenance processing and the amount of consumption of ink calculated based on the print image data IM as the estimated amount of consumption of ink.

<Measurement of Amount of Remaining Ink>

Figure 14:
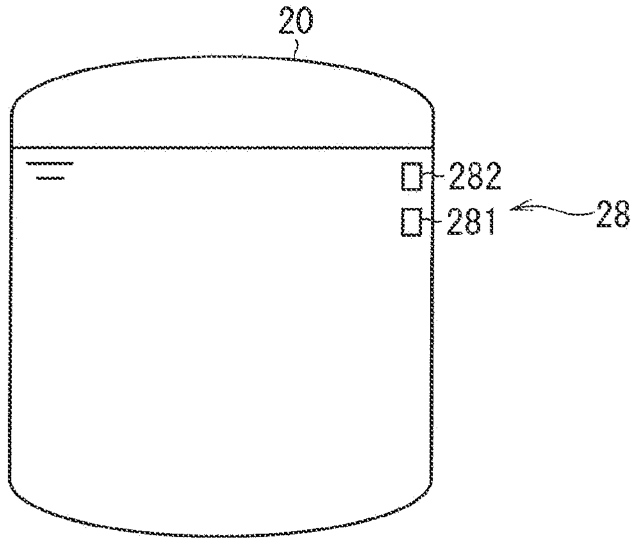
FIG. 14 is a diagram schematically illustrating an example of a configuration of a sub-tank.

Next, the remaining amount sensor 28 will be described. Although the remaining amount sensor 28 does not need to be particularly limited in type, an example thereof will be described below. FIG. 14 is a diagram schematically illustrating an example of a configuration of the sub-tank 20. The remaining amount sensor 28 is provided in the sub-tank 20. The remaining amount sensor 28 in the example of FIG. 14 includes liquid level sensors 281 and 282. The liquid level sensor 281 is a so-called level sensor, and is provided at a first height position in the sub-tank 20. The liquid level sensor 281 detects a liquid level of ink at the first height position. That is, the liquid level sensor 281 detects that the liquid level of the ink is within a predetermined range including the first height position. The first height position is a height position at which the amount of remaining ink equals to a first reference value. Thus, it can be said that the liquid level sensor 281 detects that the amount of remaining ink is within a predetermined range including the first reference value. The predetermined range is small, so that the liquid level sensor 281 can substantially detect that the amount of remaining ink equals to the first reference value. The first reference value is set to a value smaller than the capacity of the sub-tank 20 (here, 18 L), and is set to a value smaller by 1 L than the capacity of the sub-tank 20 (e.g., 17 L), for example. Here, the first reference value is equal to the refill reference value.

The liquid level sensor 282 is also a so-called level sensor, and is provided at a second height position higher than the first height position in the sub-tank 20. The liquid level sensor 282 detects a liquid level at the second height position. That is, the liquid level sensor 282 detects that the liquid level of ink is within a predetermined range including the second height position. The second height position is a height position at which the amount of remaining ink equals to a second reference value. Thus, the liquid level sensor 282 substantially detects that the amount of remaining ink equals to the second reference value. The second reference value is set to a value equal to or less than the capacity (here, 18 L) of the sub-tank 20, and is set to the same value (e.g., 18 L) as the capacity of the sub-tank 20, for example.

Figure 15:
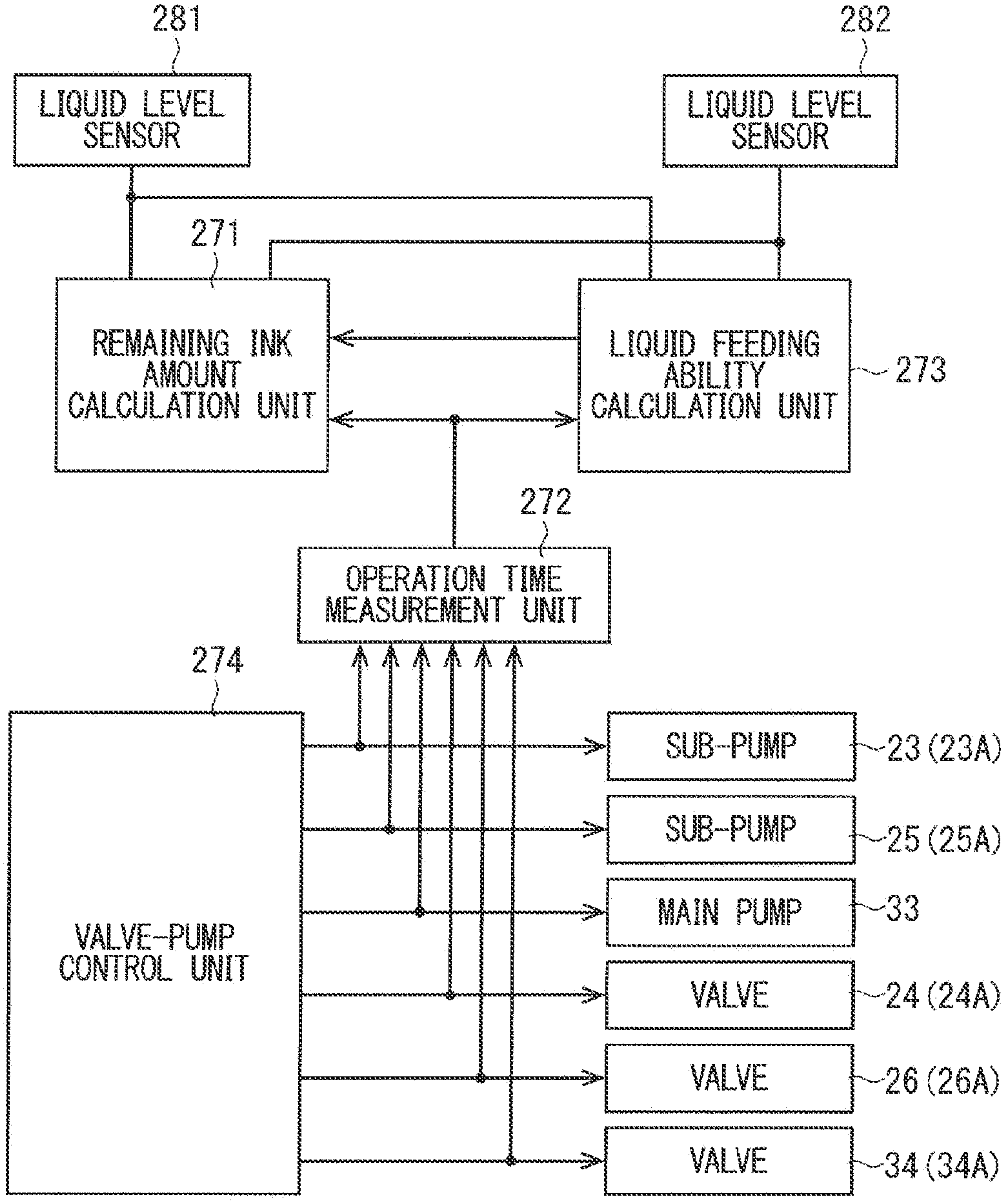
FIG. 15 is a block diagram schematically illustrating an example of a configuration for measuring the amount of remaining ink.

In the present embodiment, the amount of remaining ink in the sub-tank 20 is obtained with higher accuracy. FIG. 15 is a block diagram schematically illustrating an example of a configuration that implements a function of measuring the amount of remaining ink. Hereinafter, measurement of the amount of remaining ink in the sub-tank 20A will be representatively described for simplicity of description.

The example of FIG. 15 includes a remaining ink amount calculation unit 271, an operation time measurement unit 272, a liquid feeding ability calculation unit 273, and a valve-pump control unit 274. These functional units are appropriately mounted on the control units 27A and 42, and the like.

The remaining ink amount calculation unit 271 calculates the amount of remaining ink in the sub-tank 20A. Referring also to FIG. 1, the remaining ink amount calculation unit 271 calculates an outflow of ink from the sub-tank 20A to the printing unit 10A based on operation time and the liquid feeding ability of the sub-pumps 23A and 25A as described later in detail, and an inflow of ink from the main tank 40 to the sub-tank 20A based on operation time and the liquid feeding ability of the main pump 33 in a state where the valve 34A is opened, thereby calculating the amount of remaining ink in the sub-tank 20A based on the calculated inflow and outflow of the ink. The remaining ink amount calculation unit 271 can be mounted on the tank-side control unit 27A, for example.

The liquid feeding ability calculation unit 273 acquires the liquid feeding ability of the sub-pump 23A, the liquid feeding ability of the sub-pump 25A, and the liquid feeding ability of the main pump 33. Although these kinds of liquid feeding ability can be calculated by a method described in detail later, a preset value may be adopted. The liquid feeding ability calculation unit 273 has a function that can be implemented in the tank-side control unit 27, for example.

The valve-pump control unit 274 outputs control signals to the sub-pumps 23A and 25A, the main pump 33, and the valves 24A, 26A, and 34A to control them. Here, the valve-pump control unit 274 controls the valves 34A and 34B exclusively for each other. That is, when the valve 34A is opened, the valve 34B is closed, and when the valve 34B is opened, the valve 34A is closed. The valve-pump control unit 274 has a function that is appropriately implemented in the tank-side control unit 27A and the tank-side control unit 42, for example.

The operation time measurement unit 272 includes a timer circuit (not illustrated), for example, and accumulates and measures operation time of the sub-pump 23A, operation time of the sub-pump 25A, and operation time of the main pump 33 based on the corresponding control signals. More specifically, the operation time measurement unit 272 accumulates and measures the operation time of the sub-pump 23A in a state where the valve 24A is opened, accumulates and measures the operation time of the sub-pump 25A in a state where the valve 26A is opened, and accumulates and measures the operation time of the main pump 33 in a state where the valve 34A is opened. The operation time measurement unit 272 can be mounted on the tank-side control unit 27A, for example.

The remaining ink amount calculation unit 271 instructs the operation time measurement unit 272 to measure the operation time when the liquid level sensor 281 in the sub-tank 20A detects a liquid level, or when the amount of remaining ink in the sub-tank 20A equals to the first reference value. Thus, the operation time measurement unit 272 measures the operation time of each of the pumps 23A, 25A, and 33 from a time point (referred to below as a reference time point), at which the amount of remaining ink equals to the first reference value, to the current time point.

The inflow of the ink supplied from the main tank 40 to the sub-tank 20A in a period from the reference time point to the current time point is represented by the product of the operation time of the pump 33 in a state where the valve 34A is opened and the liquid feeding ability. Thus, the remaining ink amount calculation unit 271 calculates an inflow (also referred to below as an inflow Fi20) of ink from the sub-tank 20 from the reference time point to the current time point based on Expression (2) below.

$$Fi20 = t33 \cdot P33 \qquad (2)$$

where t33 represents an accumulated value of the operation time of the main pump 33 in a state where the valve 34A is opened in the period from the reference time point to the current time point, and P33 represents the liquid feeding ability of the main pump 33.

Then, the outflow of the ink supplied from the sub-tank 20A to the printing unit 10A in the period from the reference time point to the current time point is represented by a sum of the product of the operation time and the liquid feeding ability of the pump 23A in a state where the valve 24A is opened and the product of the operation time and the liquid feeding ability of the pump 25A in a state where the valve 26A is opened. Thus, the remaining ink amount calculation unit 271 calculates an outflow (also referred to below as an outflow Fo20) of ink to the sub-tank 20 from the reference time point to the current time point based on Expression (3) below.

$$Fo20=t23\cdot P23+t25\cdot P25 \quad (3)$$

where t23 represents an accumulated value of the operation time of the sub-pump 23A in a state where the valve 24A is opened in the period from the reference time point to the current time point, t25 represents an accumulated value of the operation time of the sub-pump 25A in a state where the valve 26A is opened in the period from the reference time point to the current time point, and P23 and P25 represent the liquid feeding abilities of the sub-pumps 23A and 25A, respectively.

The remaining ink amount calculation unit 271 calculates the amount of remaining ink (also referred to below as the amount F20 of remaining ink) in the sub-tank 20A by Expression below based on the first reference value (also referred to below as a first reference value Fref1), the inflow Fi20 of the ink, and the outflow Fo20 of the ink.

$$F20=Fref1+Fi20-Fo20 \quad (4)$$

According to this, the amount F20 of remaining ink in the sub-tank 20A can be calculated using the simple liquid level sensor 281 (level sensor). The same applies to the sub-tank 20B.

<Liquid Feeding Ability of Pump>

Next, an example of a method for calculating the liquid feeding abilities P23 and P25 of the sub-pumps 23A and 25A will be described. First, initial values of the liquid feeding abilities P23 and P25 are set. For example, the initial values of the liquid feeding abilities P23 and P25 may be set from design specifications of the sub-pumps 23A and 25A.

Figure 16:
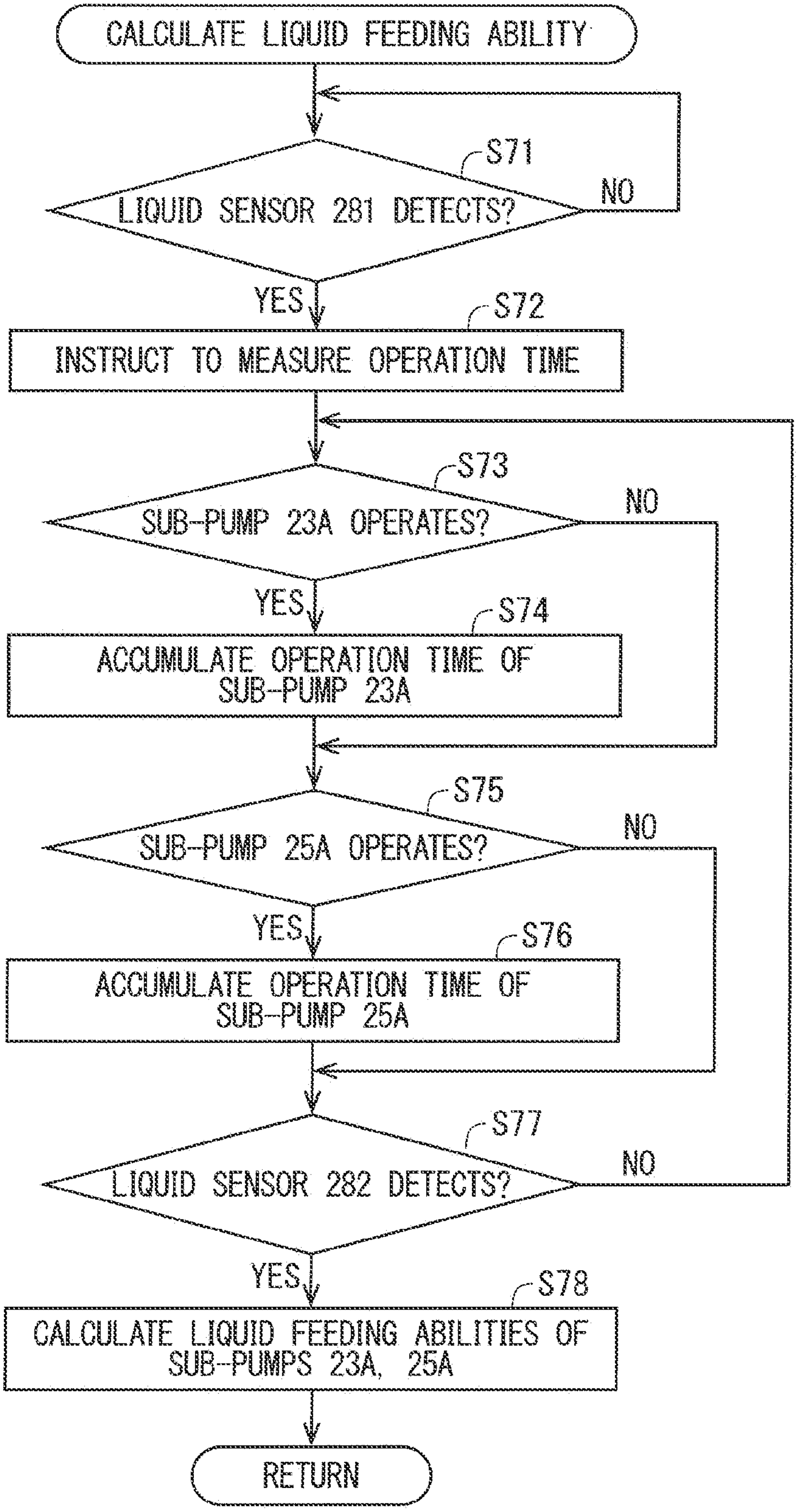
FIG. 16 is a flowchart illustrating an example of a process of calculating liquid feeding ability.

FIG. 16 is a flowchart illustrating an example of a process of calculating liquid feeding ability. This flow can be performed while the print processing of the printing unit 10A is performed. First, the liquid feeding ability calculation unit 273 determines whether the liquid level sensor 282 detects a liquid level (step S71). That is, it is determined whether the amount of remaining ink in the sub-tank 20A is the second reference value. When the amount of remaining ink is not the second reference value, the liquid feeding ability calculation unit 273 performs step S71 again without performing processing described later.

When the amount of remaining ink equals to the second reference value, the liquid feeding ability calculation unit 273 instructs the operation time measurement unit 272 to measure the operation time of the sub-pumps 23A and 25A (step S72). Here, when the amount of remaining ink in the sub-tank 20A is larger than the first reference value that is equal to the refill reference value, the ink is not supplied to the sub-tank 20A. As a result, the ink is not supplied to the sub-tank 20A until the amount of remaining ink becomes equal to or less than the first reference value after the time point at which the amount of remaining ink equals to the second reference value. Thus, the operation time measurement unit 272 here does not need to measure the operation time of the main pump 33.

In response to the instruction, the operation time measurement unit 272 determines whether the sub-pump 23A operates (step S73). Specifically, the operation time measurement unit 272 determines whether the sub-pump 23A operates in a state where the valve 24A is opened. When the sub-pump 23A operates, the operation time measurement unit 272 accumulates the operation time of the sub-pump 23A (step S74). Specifically, the operation time measurement unit 272 causes a timer circuit for the sub-pump 23A to operate while initializing the timer circuit in synchronization with a start of operation of the sub-pump 23A. Then, during a period in which the sub-pump 23A operates, the timer circuit is not stopped, and the timer circuit continues to count a timer value. In contrast, when the sub-pump 23A does not operate, the operation time is not accumulated. That is, the timer circuit for the sub-pump 23A stops counting.

Next, the operation time measurement unit 272 determines whether the sub-pump 25A operates (step S75). Specifically, the operation time measurement unit 272 determines whether the sub-pump 25A operates in a state where the valve 26A is opened. When the sub-pump 25A operates, the operation time measurement unit 272 accumulates the operation time of the sub-pump 25A (step S76). Specifically, the operation time measurement unit 272 causes a timer for the sub-pump 25A to operate while initializing the timer in synchronization with a start of operation of the sub-pump 25A. Then, during a period in which the sub-pump 25A operates, the timer circuit is not stopped, and the timer circuit continues to count a timer value. In contrast, when the sub-pump 25A does not operate, the operation time is not accumulated. That is, the timer circuit for the sub-pump 25A stops counting.

Next, the liquid feeding ability calculation unit 273 determines whether the liquid level sensor 281 detects a liquid level (step S77). That is, the liquid feeding ability calculation unit 273 determines whether the amount of remaining ink in the sub-tank 20A is the first reference value. When the amount of remaining ink does not equal to the first reference value, step S73 is performed again. That is, the operation time of the sub-pumps 23A and 25A is accumulated until the amount of remaining ink decreases to the first reference value.

When the amount of remaining ink is the first reference value, the liquid feeding ability calculation unit 273 calculates (updates) the liquid feeding abilities of the sub-pumps 23A and 25A based on the operation time of the sub-pumps 23A and 25A as described below (step S78). Hereinafter, a concept of the method for calculating the liquid feeding ability will be first described.

Steps S71 to S77 described above are performed to measure operation times (also referred to below as operation times t23*d* and t25*d*) of the sub-pumps 23A and 25A in a period (also referred to below as a sub-measurement period) until the amount of remaining ink decreases from the second reference value to the first reference value. A calculated value Fo20c of the outflow of ink supplied from the sub-tank 20A to the printing unit 10A in this sub-measurement period can be expressed by Expressions below.

$$Fo20c=F23c+F25c \quad (5)$$

$$F23c=t23d\cdot P23 \quad (6)$$

$$F25c=t25d\cdot P25 \quad (7)$$

where F23*c* represents a calculated value of the outflow of ink supplied to the printing unit 10A via the sub-pump 23A in the sub-measurement period, and F25*c* represents a calculated value of the outflow of ink supplied to the printing unit 10A via the sub-pump 25A in the sub-measurement period.

In contrast, an actual value Fo20*a* of the outflow of ink in the sub-measurement period is expressed by Expression below.

$$Fo20a=Fref2-Fref1 \quad (8)$$

where Fref1 and Fref2 represent the first reference value and the second reference value, respectively.

When the liquid feeding abilities P23 and P25 (initial values) of the sub-pumps 23A and 25A are appropriate values corresponding to an actual situation, the calculated value Fo20c of the outflow of ink obtained based on Expressions (5) to (7) equals the actual value Fo20a of the outflow of ink. However, when the initial value does not correspond to the actual situation, the calculated value Fo20c is different from the actual value Fo20a.

Then, the liquid feeding ability calculation unit 273 calculates a difference ΔF20 (=Fo20c−Fo20a) between the calculated value Fo20c and the actual value Fo20a, and calculates (updates) the values of the liquid feeding abilities P23 and P25 of the sub-pumps 23A and 25A based on the difference AF20 by Expression below.

$$P23=(F23c-\Delta F20\cdot F23c/Fo20c)/t23d \quad (9)$$

$$P25=(F25c-\Delta F20\cdot F25c/Fo20c)/t25d \quad (10)$$

These Expressions enable the values of the liquid feeding abilities P23 and P25 of the sub-pumps 23A and 25A to be brought closer to actual values. The same applies to the liquid feeding ability of each of the sub-pumps 23B and 25B.

The process of calculating liquid feeding ability of FIG. 16 may be repeatedly performed. According to this, each time the amount of remaining ink in the sub-tank 20A decreases from the second reference value to the first reference value, the liquid feeding abilities P23 and P25 of the sub-pumps 23A and 25A are updated. Thus, even when the sub-pumps 23A and 25A deteriorate over time, the liquid feeding abilities P23 and P25 can be updated reflecting the deterioration over time. Additionally, although ink changed in type causes the liquid feeding abilities of the sub-pumps 23A and 25A to be also changed, the liquid feeding abilities P23 and P25 of the sub-pumps 23A and 25A can be updated in response to the change in ink.

Next, a method for calculating liquid feeding ability P33 of the main pump 33 will be described. The liquid feeding ability calculation unit 273 may perform the process of calculating the liquid feeding ability P33 described later every time the amount of remaining ink in the sub-tank 20A equals to the first reference value Fref1 (17 L) while the printing unit 10A performs the print processing.

The central control unit 50 determines that the sub-tank 20A needs to be refilled with ink when the amount of remaining ink in the sub-tank 20A is equal to or less than the first reference value Fref1. In this case, the sub-tank 20A is supplied with the ink by opening the valve 34A according to the priority of the sub-tanks 20A and 20B. When the printing units 10A and 10B each have a printing rate that is not so high, the amount of remaining ink in each of the sub-tanks 20A and 20B can increase to the second reference value again.

The liquid feeding ability calculation unit 273 instructs the operation time measurement unit 272 to measure operation time of each of the sub-pumps 23A and 25A, and the main pump 33 when the liquid level sensor 281 of the sub-tank 20A detects a liquid level. That is, the liquid feeding ability calculation unit 273 instructs measurement of the operation time when the amount of remaining ink in the sub-tank 20A equals to the first reference value Fref1.

The operation time measurement unit 272 initializes the timer circuit for the sub-pump 23A, the timer circuit for the sub-pump 25A, and a timer circuit for the pump 33 according to the instruction. This enables accumulating and measuring the operation time of each of the sub-pumps 23A and 25A, and the main pump 33 after a time point at which the amount of remaining ink equals to the first reference value Fref1. The operation time measurement unit 272 then measures the operation time of the main pump 33 in a state where the valve 34A is opened. In other words, when the valve 34B is opened, the operation time of the main pump 33 is not accumulated.

The liquid feeding ability calculation unit 273 calculates (updates) the liquid feeding ability P33 of the main pump 33 when the liquid level sensor 282 detects a liquid level. That is, the liquid feeding ability calculation unit 273 calculates the liquid feeding ability P33 when the amount of remaining ink in the sub-tank 20A equals to the second reference value. Hereinafter, a concept of a method for calculating the liquid feeding ability P33 will be first described.

Expression below using the first reference value Fref1 and the second reference value Fref2 expresses an increment ΔFu of the amount of remaining ink in a period (referred to below as a main measurement period) until the amount of remaining ink in the sub-tank 20A increases from the first reference value Fref1 to the second reference value Fref2.

$$\Delta Fu=Fref2-Fref1 \quad (11)$$

Alternatively, the increment ΔFu is also represented by Expression below because the increment ΔFu is represented by a difference between the inflow and the outflow of the ink in the sub-tank 20A in the main measurement period.

$$\Delta Fu=t33u\cdot P33-t23u\cdot P23-t25u\cdot P25 \quad (12)$$

where t33u represents an accumulated value of the operation time of the main pump 33 in a state where the valve 34A is opened in the main measurement period, and t23u and t25u represent accumulated values of the operation times of the pumps 23A and 25A in the main measurement period, respectively.

Expression below can be derived from Expressions (11) and (12).

$$P33=\{(Fref2-Fref1)+t23u\cdot P23+t25u\cdot P25\}/t33u \quad (13)$$

The liquid feeding ability calculation unit 273 calculates the liquid feeding ability P33 of the main pump 33 using Expression (13).

When the printing unit 10A does not perform a process involving ink consumption such as print processing in the main measurement period, the operation times t23u and t25u become zero. In this case, the liquid feeding ability P23 can be calculated without using the values of the liquid feeding abilities P25 and P33 as can be understood from Expression (13). Thus, the liquid feeding ability P23 can be calculated with high accuracy without being affected by an error of each of the liquid feeding abilities P25 and P33.

Although the printing apparatus 100 has been described in detail as described above, the above description is an example in all aspects, and the printing apparatus 100 is not limited to the description. Thus, it is understood that numerous modifications, which are not illustrated, can be assumed without departing from the scope of the present disclosure. Configurations described in the corresponding above embodiments and modifications can be appropriately combined or eliminated as long as the configurations do not contradict each other.

For example, when only one of the printing units 10A and 10B performs the print processing, the ink may be preferentially supplied to the sub-tank 20 corresponding to the one, and when both of the printing units 10A and 10B performs the print processing, it may be determined which one of the sub-tanks 20A and 20B is preferentially supplied with the ink based on the estimated amount of remaining ink in each of the sub-tanks 20A and 20B.

The printing apparatus 100 may include three or more printing units 10 and three or more sub-tanks 20, for example. The ink may be supplied to only the sub-tank 20 having the highest priority among the plurality of sub-tanks 20, or the ink may be supplied to each sub-tank 20 at a flow rate corresponding to a priority of each sub-tank 20.

When three or more sub-tanks 20 are provided, main tanks 40 and main pumps 33, which are each less in number than the sub-tanks 20, may be provided. In this case, a sum total of the liquid feeding abilities of the main pumps 33 is set to be less than a sum total of the liquid feeding abilities of the sub-pumps 23 and 25 of the plurality of printing units 10.

The example described above includes the central control unit 50, and the tank-side control units 27 and 42. Then, functions to be performed by these units may be implemented by a single control unit. Alternatively, at least one of the functions may be implemented by a control unit different from the control units described above. For example, the pump 33 may be controlled by the tank-side control unit 27.

The above example describes an aspect in which the valves 34A and 34B are controlled so that the amount of remaining ink in the sub-tank 20A and the amount of remaining ink in the sub-tank 20B are substantially equal to each other. However, the present invention is not necessarily limited thereto. For example, the valves 34A and 34B may be controlled so that a ratio of the amount of remaining ink in the sub-tank 20A to the amount of remaining ink in the sub-tank 20B falls within a predetermined range including a predetermined ratio. This control enables appropriate adjustment of a period during which the printing units 10 perform the print processing in parallel.

The printing apparatus 100 in the example described above includes the two printing units 10A and 10B as the plurality of printing units 10. The two printing units 10A and 10B then include the sub-tanks 20A and 20B, respectively, and the sub-tanks 20A and 20B are selectively supplied with ink from the main tank 40. Alternatively, the front surface printing unit 13 and the back surface printing unit 16 of the printing unit 10 can include the valves 24 and 26, and the sub-tanks 20 and 20, respectively, and the sub-tanks 20 and 20 can be supplied with the ink from the main tank 40. In this case, the central control unit 50 controls the valves 24 and 26 to enable the sub-tanks 20 and 20 to be selectively supplied with the ink from the main tank 40.

EXPLANATION OF REFERENCE SIGNS

10A: first printing unit (printing unit)
10B: second printing unit (printing unit)
13A, 13B: front surface printing unit
16A, 16B: back surface printing unit
20A: first sub-tank (sub-tank)
20B: second sub-tank (sub-tank)
23A: front-surface-side pump (sub-tank)
25A: back-surface-side pump (sub-tank)
27, 42, 50: control unit
31: common pipe
32A: first branch pipe (branch pipe)
32B: second branch pipe (branch pipe)
34A: first valve (valve)
34B: second valve (valve)
40: main tank
100: printing apparatus

The invention claimed is:

1. A printing apparatus comprising:
a first printing unit that applies ink to a printing medium to perform printing;
a first sub-tank from which ink is supplied to said first printing unit;
a second printing unit that applies ink to a printing medium to perform printing;
a second sub-tank from which ink is supplied to said second printing unit;
a first branch pipe through which ink is supplied to said first sub-tank;
a second branch pipe through which ink is supplied to said second sub-tank;
a common pipe through which ink is supplied to said first branch pipe and said second branch pipe;
a main tank from which ink is supplied to said common pipe;
a first valve provided in said first branch pipe;
a second valve provided in said second branch pipe; and
a control unit that determines which of said first sub-tank and said second sub-tank is to be preferentially supplied with ink based on at least one of the amount of remaining ink in each of said first sub-tank and said second sub-tank, and an estimated amount of consumption of ink in each of said first printing unit and said second printing unit, and that controls said first valve and said second valve based on a result of the determination.

2. The printing apparatus according to claim 1, wherein said control unit compares the amount of remaining ink in said first sub-tank and the amount of remaining ink in said second sub-tank to determine to preferentially supply ink to a sub-tank having a smaller amount of remaining ink between said first sub-tank and said second sub-tank.

3. The printing apparatus according to claim 2, wherein when said first printing unit is during print processing and said second printing unit is not during print processing, said control unit determines to preferentially supply ink to said first sub-tank rather than said second sub-tank.

4. The printing apparatus according to claim 2, wherein when said first printing unit is during print processing based on print image data and said second printing unit is in another state, said control unit determines to preferentially supply ink to said first sub-tank rather than said second sub-tank.

5. The printing apparatus according to claim 4, wherein when said first printing unit is during the print processing based on the print image data and said second printing unit is during performing print processing for checking a printing state, said control unit determines to preferentially supply ink to said first sub-tank rather than said second sub-tank.

6. The printing apparatus according to claim 4, wherein when said first printing unit is during the print processing based on the print image data and said second printing unit is during performing a recovery process, said control unit determines to preferentially supply ink to said first sub-tank rather than said second sub-tank.

7. The printing apparatus according to claim 2, wherein said control unit determines as follows:
said first sub-tank needs to be supplied with ink when the amount of remaining ink in said first sub-tank is less than a predetermined refill reference value;

said second sub-tank needs to be supplied with ink when the amount of remaining ink in said second sub-tank is less than said predetermined refill reference value; and one of said first sub-tank and said second sub-tank, the one being earlier in timing at which the amount of remaining ink falls below the predetermined refill reference value, is preferentially supplied with ink, when the amount of remaining ink in each of said first sub-tank and said second sub-tank is less than said predetermined refill reference value, and a difference between the amount of remaining ink in said first sub-tank and the amount of remaining ink in said second sub-tank is less than a predetermined difference reference value.

8. The printing apparatus according to claim 1, wherein said control unit calculates the estimated amount of consumption of ink in each of said first printing unit and said second printing unit until a predetermined period elapses from a current point of time, and said control unit determines to preferentially supply ink to said first sub-tank rather than said second sub-tank in said predetermined period when the estimated amount of consumption of ink in said first printing unit is larger than the estimated amount of consumption of ink in said second printing unit.

9. The printing apparatus according to claim 1, wherein said control unit calculates the estimated amount of consumption of ink in each of said first printing unit and said second printing unit until a predetermined period elapses from the current point of time, and said control unit determines a higher priority of supplying ink for one of said first sub-tank and said second sub-tank, the one having a larger estimated amount of consumption of ink in the corresponding printing unit and a smaller amount of remaining ink at the current point of time.

10. The printing apparatus according to claim 9, wherein said control unit calculates an estimated amount of remaining ink in said first sub-tank after elapse of said predetermined period based on the amount of remaining ink in said first sub-tank and the estimated amount of consumption of ink in said first printing unit, said control unit calculates an estimated amount of remaining ink in said second sub-tank after elapse of said predetermined period based on the amount of remaining ink in said second sub-tank and the estimated amount of consumption of ink in said second printing unit, and said control unit determines to preferentially supply ink to one of said first sub-tank and said second sub-tank in said predetermined period, the one having a smaller amount of estimated remaining ink.

11. The printing apparatus according to claim 9, wherein said control unit calculates a priority of said first sub-tank by weighting the amount of remaining ink in said first sub-tank and the estimated amount of consumption of ink in said first printing unit, and said control unit calculates a priority of said second sub-tank by weighting the amount of remaining ink in said second sub-tank and the estimated amount of consumption of ink in said second printing unit.

12. The printing apparatus according to claim 6, wherein said control unit determines which one of said first sub-tank and said second sub-tank is to be preferentially supplied with ink, when the amount of remaining ink in each of said first sub-tank and said second sub-tank is equal to or greater than a switching reference value, based on the amount of remaining ink in each of said first sub-tank and said second sub-tank without using the estimated amount of remaining ink in each of said first printing unit and said second printing unit, and said control unit determines which one of said first sub-tank and said second sub-tank is to be preferentially supplied with ink, when at least one of the amount of remaining ink in said first sub-tank and the amount of remaining ink in said second sub-tank is less than said switching reference value, based on the amount of remaining ink in each of said first sub-tank and said second sub-tank, and the estimated amount of remaining ink in each of said first printing unit and said second printing unit.

13. The printing apparatus according to claim 1, wherein said control unit calculates an estimated total amount of consumption of ink in said first printing unit and an estimated total amount of consumption of ink in said second printing unit, the estimated total amounts being necessary for remaining printing of the print image data, said control unit calculates a first value obtained by subtracting the estimated total amount of consumption of ink in said first printing unit from the amount of remaining ink in said first sub-tank and a second value obtained by subtracting the estimated total amount of consumption of ink in said second printing unit from the amount of remaining ink in said second sub-tank, and said control unit determines to preferentially supply ink to said second sub-tank when said first value is positive and said second value is negative.

14. The printing apparatus according to claim 1, further comprising:

a main pump provided in said common pipe;

at least one sub-pump that feeds ink from said first sub-tank to said first printing unit; and a first liquid level sensor that detects that the amount of remaining ink in said first sub-tank is a first reference value, wherein said control unit controls said first valve and said second valve exclusively for each other, said control unit obtains an inflow of ink supplied from said main pump to said first sub-tank based on an operation time in which said main pump operates while said first valve is opened and a value of liquid feeding ability of said main pump, said control unit obtains an outflow of ink supplied from said first sub-tank to said first printing unit based on the operation time of said sub-pump and a value of liquid feeding ability of said sub-pump, and said control unit calculate the amount of remaining ink in said first sub-tank based on the inflow of ink to said first sub-tank and the outflow of ink from said first sub-tank from a time point when said first liquid level sensor detects that the amount of remaining ink in said first sub-tank equals to said first reference value.

15. The printing apparatus according to claim 14, further comprising:

a second liquid level sensor that detects that the amount of remaining ink in said first sub-tank is a second reference value larger than said first reference value, wherein said first printing unit includes:

a front surface printing unit to which ink is supplied from said first sub-tank; and a back surface printing unit to which ink is supplied from said first sub-tank, said at least one sub-pump includes:

a front-surface-side pump that feeds ink from said first sub-tank to said front surface printing unit; and a back-surface-side pump that feeds ink from said first sub-tank to said back surface printing unit, and said control unit updates a value of liquid feeding ability of said front-surface-side pump and a value of liquid feeding ability of said back-surface-side pump based on a calculated value of an outflow of ink and an actual value of the outflow of ink, the calculated value being a sum of a first product of an operation time of said front-surface-side pump and a value of the liquid feeding ability of said front-surface-side pump within a sub-measurement period until the amount of remaining ink in said first sub-tank equals to said first reference value from said second reference value, and a second product of an operation time of said back-surface-side pump and a value of the liquid feeding ability of said back-surface-side pump within said sub-measurement period, and the actual value being a difference between said second reference value and said first reference value.

* * * * *